United States Patent
Honda

(10) Patent No.: US 10,305,137 B2
(45) Date of Patent: May 28, 2019

(54) BATTERY INCLUDING ADHESION LAYER ADHERING POSITIVE ELECTRODE COLLECTOR OF FIRST POWER GENERATING ELEMENT TO NEGATIVE ELECTRODE COLLECTOR OF SECOND POWER GENERATING ELEMENT, BATTERY MANUFACTURING METHOD, AND BATTERY MANUFACTURING APPARATUS

(71) Applicant: Panasonic Intellectual Property Management Co., Ltd., Osaka (JP)

(72) Inventor: Kazuyoshi Honda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 47 days.

(21) Appl. No.: 15/482,840

(22) Filed: Apr. 10, 2017

(65) Prior Publication Data
US 2017/0309946 A1    Oct. 26, 2017

(30) Foreign Application Priority Data
Apr. 25, 2016    (JP) .................. 2016-086781

(51) Int. Cl.
*B32B 7/12* (2006.01)
*B32B 15/00* (2006.01)
(Continued)

(52) U.S. Cl.
CPC ........... *H01M 10/0418* (2013.01); *B32B 7/12* (2013.01); *B32B 15/00* (2013.01);
(Continued)

(58) Field of Classification Search
CPC ............. H01M 10/48; H01M 10/0404; H01M 10/0525; H01M 10/0585; B32B 7/12; B32B 15/00; B32B 37/0046; B32B 37/12
(Continued)

(56) References Cited

U.S. PATENT DOCUMENTS

| 2012/0208082 A1* | 8/2012 | Honda | H01M 4/60 429/210 |
| 2014/0147746 A1* | 5/2014 | Tanaka | H01M 4/666 429/211 |

(Continued)

FOREIGN PATENT DOCUMENTS

| JP | 2009-135079 | 6/2009 | |
| WO | WO-2016031688 A1 * | 3/2016 | ............ H01M 2/22 |

*Primary Examiner* — Sean P Cullen
(74) *Attorney, Agent, or Firm* — McDermott Will & Emery LLP

(57) ABSTRACT

A battery is provided which includes a first power generating element, a second power generating element, and a first adhesion layer adhering the first power generating element to the second power generating element. A first positive electrode collector of the first power generating element and a second negative electrode collector of the second power generating element face each other with (i.e., via) the first adhesion layer. Between the first positive electrode collector and the second negative electrode collector, the first adhesion layer is disposed in a region forming a first positive electrode active material layer or a region forming a second negative electrode active material layer, whichever is smaller. The first positive electrode collector and the second negative electrode collector are not in contact with each other in a region in which the first positive electrode active material layer and the second negative electrode active material layer face each other.

12 Claims, 20 Drawing Sheets

(51) Int. Cl.
  *B32B 37/00* (2006.01)
  *B32B 37/12* (2006.01)
  *H01M 10/04* (2006.01)
  *H01M 10/0525* (2010.01)
  *H01M 10/0585* (2010.01)

(52) U.S. Cl.
  CPC .......... *B32B 37/0046* (2013.01); *B32B 37/12* (2013.01); *H01M 10/0404* (2013.01); *H01M 10/0468* (2013.01); *H01M 10/0481* (2013.01); *H01M 10/0525* (2013.01); *H01M 10/0585* (2013.01); *B32B 2255/06* (2013.01); *B32B 2307/202* (2013.01); *B32B 2311/12* (2013.01); *B32B 2311/30* (2013.01); *B32B 2315/00* (2013.01); *B32B 2457/10* (2013.01); *Y02T 10/7011* (2013.01)

(58) Field of Classification Search
  USPC .................................................. 429/152, 233
  See application file for complete search history.

(56) References Cited

U.S. PATENT DOCUMENTS

| | | | |
|---|---|---|---|
| 2017/0279113 A1* | 9/2017 | Ohsawa | H01M 2/22 |
| 2018/0090766 A1* | 3/2018 | Ohsawa | H01M 4/13 |

* cited by examiner

1300

1500

BATTERY INCLUDING ADHESION LAYER ADHERING POSITIVE ELECTRODE COLLECTOR OF FIRST POWER GENERATING ELEMENT TO NEGATIVE ELECTRODE COLLECTOR OF SECOND POWER GENERATING ELEMENT, BATTERY MANUFACTURING METHOD, AND BATTERY MANUFACTURING APPARATUS

BACKGROUND

1. Technical Field

The present disclosure relates to a battery, a battery manufacturing method, and a battery manufacturing apparatus.

2. Description of the Related Art

Japanese Unexamined Patent Application Publication No. 2009-135079 has disclosed a bipolar secondary battery in which adhesion portions are formed on parts of an adhesion surface at which adjacent bipolar battery laminates are in contact with each other, and bipolar batteries located in a lamination direction are fixed by those adhesion portions.

SUMMARY

In a related technique, the probability of contact between a positive electrode collector and a negative electrode collector is preferably reduced.

In one general aspect, the techniques disclosed here feature a battery comprising: a first power generating element, a second power generating element laminated on the first power generating element, and a first adhesion layer adhering the first power generating element to the second power generating element; the first power generating element includes a first positive electrode collector, a first negative electrode collector, a first positive electrode active material layer, a first negative electrode active material layer, and a first solid electrolyte layer; the first positive electrode active material layer and the first negative electrode active material layer are laminated to each other with the first solid electrolyte layer; the first positive electrode active material layer is disposed in a region smaller than that of the first positive electrode collector in contact with the first positive electrode collector; the first negative electrode active material layer is disposed in a region smaller than that of the first negative electrode collector in contact with the first negative electrode collector; the second power generating element includes a second positive electrode collector, a second negative electrode collector, a second positive electrode active material layer, a second negative electrode active material layer, and a second solid electrolyte layer; the second positive electrode active material layer and the second negative electrode active material layer are laminated to each other with the second solid electrolyte layer; the second positive electrode active material layer is disposed in a region smaller than that of the second positive electrode collector in contact with the second positive electrode collector; the second negative electrode active material layer is disposed in a region smaller than that of the second negative electrode collector in contact with the second negative electrode collector; the first positive electrode collector and the second negative electrode collector face each other with the first adhesion layer; the first adhesion layer is disposed in the region forming the first positive electrode active material layer or the region forming the second negative electrode active material layer, whichever is smaller, between the first positive electrode collector and the second negative electrode collector; and the first positive electrode collector and the second negative electrode collector are not in contact with each other in a region in which the first positive electrode active material layer and the second negative electrode active material layer face each other.

According to the present disclosure, the probability of contact between the positive electrode collector and the negative electrode collector can be reduced.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Hereinafter, embodiments of the present disclosure will be described with reference to the drawings.

Embodiment 1

Figure 1:
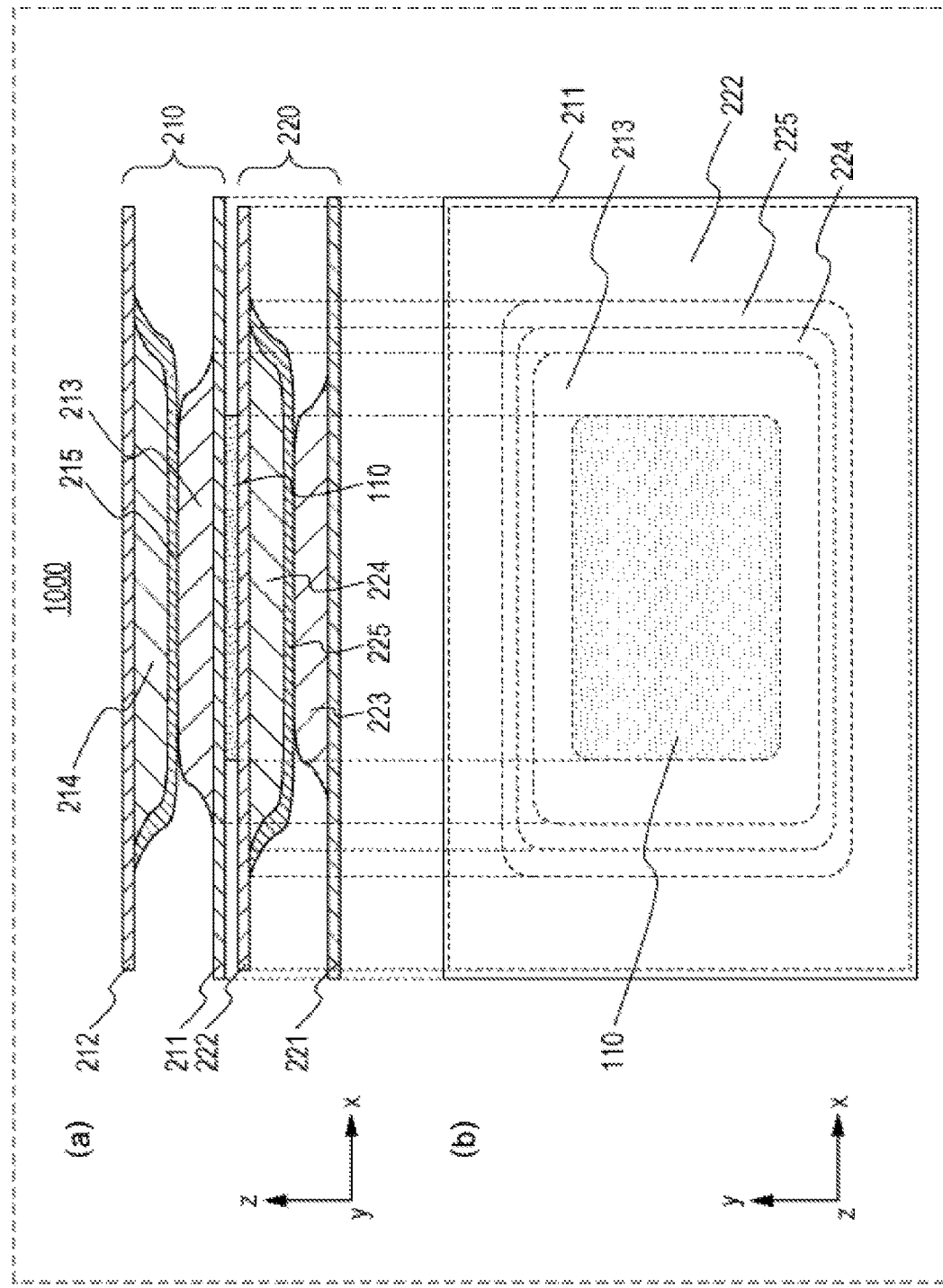
FIG. 1 is a view showing a schematic structure of a battery according to Embodiment 1.

FIG. 1 is a view showing a schematic structure of a battery 1000 according to Embodiment 1.

A part (a) of FIG. 1 is an x-z view (cross-sectional view) showing a schematic structure of the battery 1000 according to Embodiment 1.

A part (b) of FIG. 1 is an x-y view (plan perspective view) showing a schematic structure of the battery 1000 according to Embodiment 1.

The battery 1000 according to Embodiment 1 include a first adhesion layer 110 (e.g., adhesive layer), a first power generating element 210, and a second power generating element 220.

The first power generating element 210 and the second power generating element 220 are laminated to each other.

The first adhesion layer 110 adheres the first power generating element 210 to the second power generating element 220.

In this embodiment, the first power generating element 210 includes a first positive electrode collector 211, a first negative electrode collector 212, a first positive electrode active material layer 213, a first negative electrode active material layer 214, and a first solid electrolyte layer 215.

The first positive electrode active material layer 213 and the first negative electrode active material layer 214 are laminated to each other with (i.e., via) the first solid electrolyte layer 215 interposed therebetween.

The first positive electrode active material layer 213 is in contact with the first positive electrode collector 211. The first positive electrode active material layer 213 is disposed in a region smaller than that of the first positive electrode collector 211.

The first negative electrode active material layer 214 is in contact with the first negative electrode collector 212. The first negative electrode active material layer 214 is disposed in a region smaller than that of the first negative electrode collector 212.

In addition, the second power generating element 220 includes a second positive electrode collector 221, a second negative electrode collector 222, a second positive electrode active material layer 223, a second negative electrode active material layer 224, and a second solid electrolyte layer 225.

The second positive electrode active material layer 223 and the second negative electrode active material layer 224 are laminated to each other with (i.e., via) the second solid electrolyte layer 225 interposed therebetween.

The second positive electrode active material layer 223 is in contact with the second positive electrode collector 221. The second positive electrode active material layer 223 is disposed in a region smaller than that of the second positive electrode collector 221.

The second negative electrode active material layer 224 is in contact with the second negative electrode collector 222. The second negative electrode active material layer 224 is disposed in a region smaller than that of the second negative electrode collector 222.

The first positive electrode collector 211 and the second negative electrode collector 222 face each other with (i.e., via) the first adhesion layer 110 interposed therebetween.

The first adhesion layer 110 is disposed in the region forming the first positive electrode active material layer 213 or the region forming the second negative electrode active material layer 224, whichever is smaller, between the first positive electrode collector 211 and the second negative electrode collector 222.

The first positive electrode collector 211 and the second negative electrode collector 222 are not in contact with each other in a region in which the first positive electrode active material layer 213 and the second negative electrode active material layer 224 face each other.

According to the structure described above, while a strong adhesion and a stable electrical connection between the first power generating element 210 and the second power generating element 220 are realized, the probability of contact between the positive electrode collector and the negative electrode collector can be reduced. That is, at an end portion of the first positive electrode collector 211 and at an end portion of the second negative electrode collector 222, the thickness of the first adhesion layer 110 is not excessively large. Hence, the end portion of the first positive electrode collector 211 and the end portion of the second negative electrode collector 222 are avoided from being deformed by the first adhesion layer 110. Accordingly, the proximity and the contact between the first positive electrode collector 211 and the first negative electrode collector 212 and the proximity and the contact between the second positive electrode collector 221 and the second negative electrode collector 222 can be prevented. Hence, for example, even in an all-solid-state battery in which no separators are provided between a positive electrode layer and a negative electrode layer, a risk in which the positive electrode layer and the negative electrode layer are short-circuited by a direct contact between the positive electrode collector and the negative electrode collector can be reduced. In addition, degradation (such as generation of cracks) of the first positive electrode active material layer 213, the second negative electrode active material layer 224, and the solid electrolyte layer caused by the deformation of the end portion of the first positive electrode collector 211 and the end portion of the second negative electrode collector 222 can be prevented.

In addition, since the first positive electrode collector 211 and the second negative electrode collector 222 are not in contact with each other by the first adhesion layer 110, the electrical conduction state between the first positive electrode collector 211 and the second negative electrode collector 222 can be formed to have a low resistance and can also be stabilized. Hence, by a low resistance electrical conduction state, for example, even when the first power generating element 210 and the second power generating element 220 are charged or discharged by a large current, generation of voltage loss, heat, and the like can be suppressed. Furthermore, since the electrical conduction state is stabilized, for example, even by a long-term use, generation of corrosion of the first positive electrode collector 211 and the second negative electrode collector 222 can be suppressed.

Details of the above effects will be described with reference to the following Comparative Examples 1 and 2.

Figure 18:
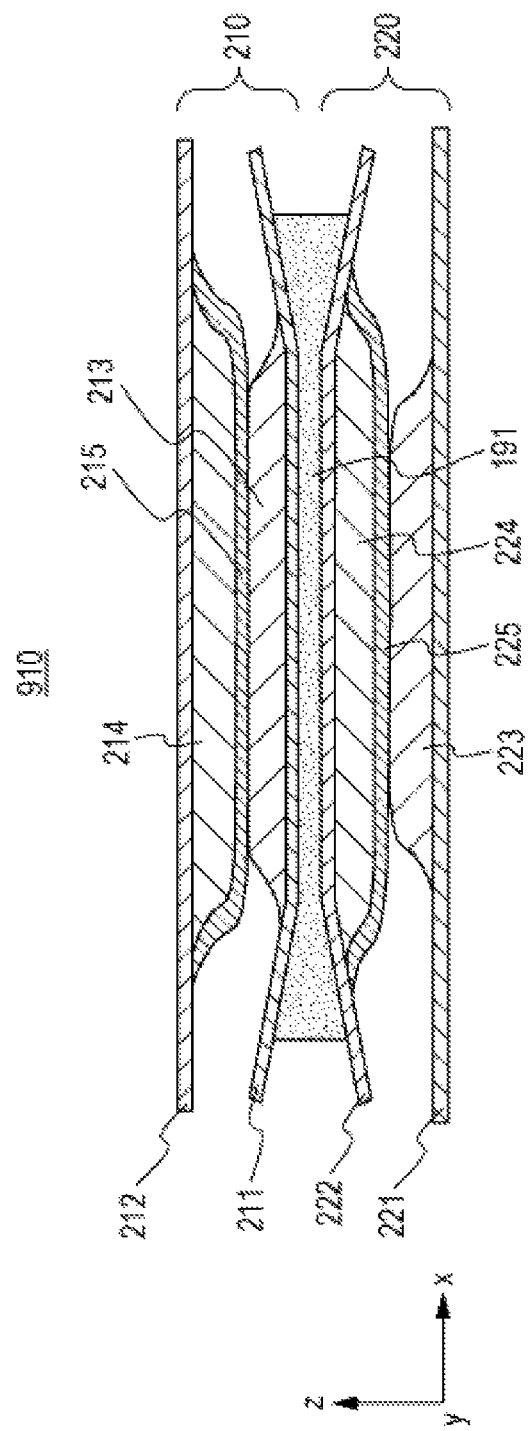
FIG. 18 is a cross-sectional view showing a schematic structure of the battery according to Comparative Example 1.

FIG. 18 is a cross-sectional view showing a schematic structure of a battery 910 according to Comparative Example 1.

The battery 910 according to Comparative Example 1 includes an adhesion layer 191, the first power generating element 210, and the second power generating element 220.

In this case, in the battery 910 according to Comparative Example 1, the adhesion layer 191 is formed to extend past the region forming the first positive electrode active material layer 213 and the region forming the second negative electrode active material layer 224.

Hence, in Comparative Example 1, as shown in FIG. 18, outside of the region forming the first positive electrode active material layer 213 and the region forming the second negative electrode active material layer 224, the thickness of the adhesion layer 191 is excessively large. Hence, the end portion of the first positive electrode collector 211 and the end portion of the second negative electrode collector 222 are deformed by the adhesion layer 191. As a result, the probability of proximity and contact between the first positive electrode collector 211 and the first negative electrode collector 212 and the probability of proximity and contact between the second positive electrode collector 221 and the second negative electrode collector 222 are increased. In addition, the first positive electrode active material layer 213, the second negative electrode active material layer 224, and the second solid electrolyte layer 225 are degraded (for example, cracks are generated) by the deformation of the end portion of the first positive electrode collector 211 and the end portion of the second negative electrode collector 222.

On the other hand, according to Embodiment 1, as described above, the thickness of the first adhesion layer 110 is not excessively large. Hence while a strong adhesion and a stable electrical connection between the first power generating element 210 and the second power generating element 220 are realized, the probability of contact between the positive electrode collector and the negative electrode collector can be reduced. In addition, the degradation (such as generation of cracks) of the first positive electrode active material layer 213, the second negative electrode active material layer 224, and the solid electrolyte layer can be prevented.

Figure 19:
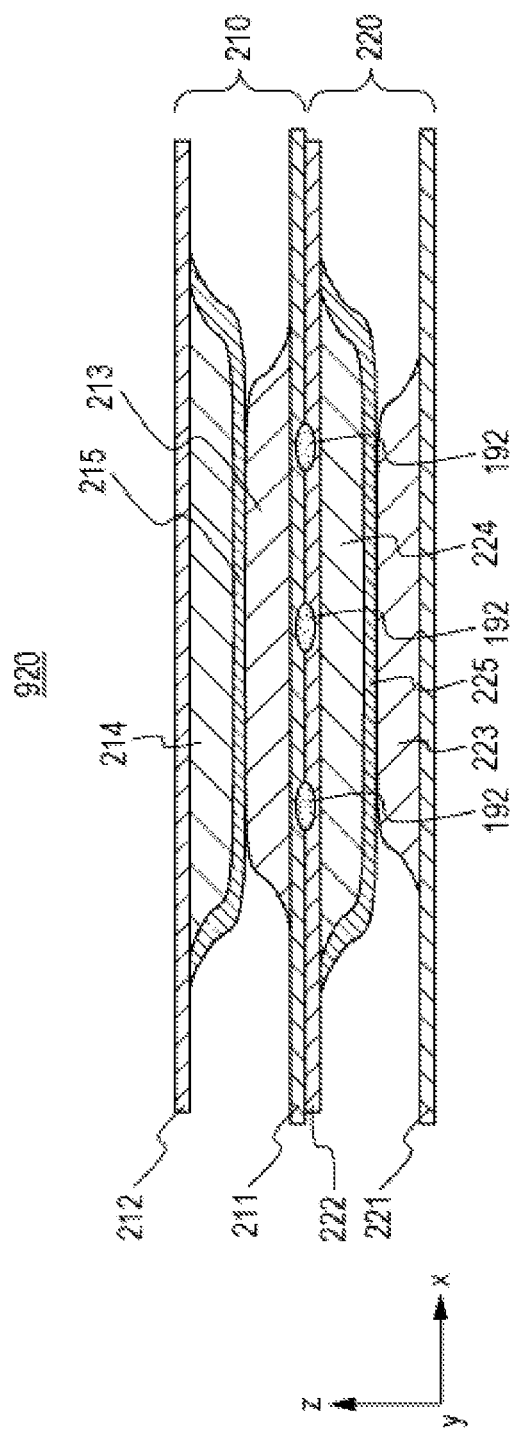
FIG. 19 is a cross-sectional view showing a schematic structure of a battery according to Comparative Example 2.

FIG. 19 is a cross-sectional view showing a schematic structure of a battery 920 according to Comparative Example 2.

The battery 920 according to Comparative Example 2 includes an adhesion layer 192, the first power generating element 210, and the second power generating element 220.

In this case, in the battery 920 according to Comparative Example 2, as shown in FIG. 19, the adhesion layer 192 is formed of a plurality of island-shaped small dots. That is, the adhesion layer 192 is not formed over the entire surface of the region in which the first positive electrode active material layer 213 and the second negative electrode active material layer 224 face each other. Hence, the first positive electrode collector 211 and the second negative electrode collector 222 are in contact with each other in the region in which the first positive electrode active material layer 213 and the second negative electrode active material layer 224 face each other.

Accordingly, in Comparative Example 2, the electrical conduction state between the first positive electrode collector 211 and the second negative electrode collector 222 is formed to have a high resistance. As a result, for example, when the first power generating element 210 and the second power generating element 220 are charged or discharge by a large current, voltage loss, heat generation, or the like is liable to occur. Furthermore, in Comparative Example 2, since the first positive electrode collector 211 and the second negative electrode collector 222 are simply in contact with each other, the electrical conduction state becomes unstable. Accordingly, for example, by a long-term use, between the first positive electrode collector 211 and the second negative electrode collector 222, defects (such as partial corrosion degradation) are liable to occur.

On the other hand, according to Embodiment 1, as described above, since the first positive electrode collector 211 is not in contact with the second negative electrode collector 222 by the first adhesion layer 110, the electrical conduction state between the first positive electrode collector 211 and the second negative electrode collector 222 can be formed to have a low resistance and can also be stabilized.

The battery 1000 according to Embodiment 1 has the structure in which the first power generating element 210 and the second power generating element 220, each of which is a single battery element (an all-solid-state battery cell), are connected in series with (i.e., via) the first adhesion layer 110 interposed therebetween.

In the battery 1000 according to Embodiment 1, the first adhesion layer 110 may be a layer containing an adhesive. Alternatively, the first adhesion layer 110 may be a layer formed of an adhesive. In this case, the adhesive may be an electrically conductive adhesive. As the electrically conductive adhesive, for example, there may be used a silicone-based soft electrically conductive adhesive (such as TB3303G or TB3333C, manufactured by ThreeBond Co., Ltd.) or a silver-containing electrically conductive epoxy adhesive (such as XA-874 or XA-910, manufactured by Fujikura Kasei Co., Ltd.).

In addition, in Embodiment 1, as shown in FIG. 1, the first adhesion layer 110 may be formed as a uniform and continuous film.

In addition, in Embodiment 1, the first adhesion layer 110 may be formed as a film having a uniform thickness in the region in which the first positive electrode active material layer 213 and the second negative electrode active material layer 224 face each other.

In addition, in Embodiment 1, the constituent elements (that is, the positive electrode collector, the negative electrode collector, the positive electrode active material layer, the negative electrode active material layer, and the solid electrolyte layer) of the first power generating element 210 each may be formed of the same material and in the same region as that corresponding to that of the second power generating element 220 or may be formed of a different material and in a different region from that corresponding to that of the second power generating element 220.

As the positive electrode collector, for example, metal foil, such as SUS foil or Al foil, may be used. The thickness of the positive electrode collector may be, for example, 5 to 100 μm.

The positive electrode active material layer is a layer containing a positive electrode active material. As the positive electrode active material contained in the positive electrode active material layer, a known positive electrode active material (such as lithium cobaltate or LiNO) may be used. As the positive electrode active material, various materials capable of releasing and inserting Li may be used.

In addition, as a material contained in the positive electrode active material layer, a known solid electrolyte (such as an inorganic solid electrolyte) may be used. As the inorganic solid electrolyte, a sulfide solid electrolyte or an oxide solid electrolyte may be used. As the sulfide solid electrolyte, for example, a mixture containing $Li_2S$ and $P_2S_5$ may be used. The surface of the positive electrode active material may be coated with a solid electrolyte. In addition, as the material contained in the positive electrode active material layer, for example, an electrically conductive material (such as acetylene black) and a binder (such as a poly(vinylidene fluoride)) may be used.

As the negative electrode collector, for example, metal foil, such as SUS foil or Cu foil, may be used. The thickness of the negative electrode collector may be, for example, 5 to 100 μm.

The negative electrode active material layer is a layer containing a negative electrode active material. As the negative electrode active material contained in the negative electrode active material layer, a known negative electrode active material (such as graphite) may be used. As the negative electrode active material, various materials capable of releasing and inserting Li may be used.

In addition, as a material contained in the negative electrode active material layer, a known solid electrolyte (such as an inorganic solid electrolyte) may be used. As the inorganic solid electrolyte, a sulfide solid electrolyte or an oxide solid electrolyte may be used. As the sulfide solid electrolyte, for example, a mixture containing $Li_2S$ and $P_2S_5$ may be used. In addition, as the material contained in the negative electrode active material layer, for example, an electrically conductive material (such as acetylene black) and a binder (such as a poly(vinylidene fluoride)) may be used.

In addition, as shown in FIG. 1, in the power generating element, the region forming the negative electrode active material layer may be larger than the region forming the positive electrode active material layer. Accordingly, for example, defects (such as degradation in reliability) of the battery caused by Li precipitation may be prevented in some cases.

Alternatively, in the power generating element, the region forming the positive electrode active material layer may be the same as the region forming the negative electrode active material layer.

In addition, as shown in FIG. 1, the region forming the first positive electrode active material layer 213 may be smaller than the region forming the second negative electrode active material layer 224. In this case, the first adhesion layer 110 is formed in the region forming the first positive electrode active material layer 213.

Alternatively, the region forming the first positive electrode active material layer 213 may be larger than the region forming the second negative electrode active material layer 224. In this case, the first adhesion layer 110 is formed in the region forming the second negative electrode active material layer 224.

Alternatively, the region forming the first positive electrode active material layer 213 may be the same as the region forming the second negative electrode active material layer 224. In this case, the first adhesion layer 110 is formed in the region forming the first positive electrode active material layer 213 (=the region forming the second negative electrode active material layer 224).

The solid electrolyte layer is a layer containing a solid electrolyte. As the solid electrolyte contained in the solid electrolyte layer, a known solid electrolyte (such as an inorganic solid electrolyte) may be used. As the inorganic solid electrolyte, for example, a sulfide solid electrolyte or an oxide solid electrolyte may be used. As the sulfide solid electrolyte, for example, a mixture containing $Li_2S$ and $P_2S_5$ may be used. In addition, as the material contained in the solid electrolyte, for example, a binder (such as a poly(vinylidene fluoride)) may be used.

In addition, as shown in FIG. 1, in the power generating element, the solid electrolyte layer may be formed in a region larger than that of any of the positive electrode active material layer and the negative electrode active material layer. Accordingly, short-circuit caused by the direct contact between the positive electrode layer and the negative electrode layer can be prevented.

In addition, as shown in FIG. 1, in the power generating element, the solid electrolyte layer may be formed in a region smaller than that of the positive electrode collector or the negative electrode collector. Accordingly, for example, when the collector is cut into a predetermined shape, generation of cracks in the solid electrolyte layer or missing of a part thereof can be suppressed. In addition, in the cutting, generation of cutting chips and generation of a cutting powder can be suppressed.

Alternatively, in the power generating element, the region forming the solid electrolyte layer may be the same as the entire region of the positive electrode collector or the negative electrode collector. When cutting is performed after the solid electrolyte layer is formed over the entire region of the collector, minute defects caused by cracks and/or missing are liable to be generated in the solid electrolyte layer in the vicinity of the cutting portion. As a result, the function of the solid electrolyte layer may be degraded in some cases. However, according to the structure of Embodiment 1, the positive electrode collector is not close to the negative electrode collector. Hence, the short-circuit between the positive electrode and the negative electrode is not likely to occur.

In addition, as shown in FIG. 1, in the power generating element, the solid electrolyte layer may be formed so as to cover the negative electrode active material layer.

Alternatively, in the power generating element, the solid electrolyte layer may be formed so as to cover the positive electrode active material layer.

Alternatively, in the power generating element, the solid electrolyte layer may be formed so as to cover the positive electrode active material layer and the negative electrode active material layer.

In addition, in Embodiment 1, as shown in FIG. 1, the first adhesion layer 110 may be disposed in a region corresponding to 50% or more of the region forming the first positive electrode active material layer 213 or the region forming the second negative electrode active material layer 224, whichever is smaller.

According to the structure described above, by the first adhesion layer 110 formed in a wider region, the mechanical joint and the electrical connection between the first power generating element 210 and the second power generating element 220 can be more stabilized. In addition, by the first adhesion layer 110 formed in a wider region, the state in which the first positive electrode collector 211 and the second negative electrode collector 222 are not in contact with each other can be more reliably maintained. Hence, the electrical conduction state between the first positive electrode collector 211 and the second negative electrode collector 222 can be formed to have a lower resistance and can also be more stabilized.

Figure 2:
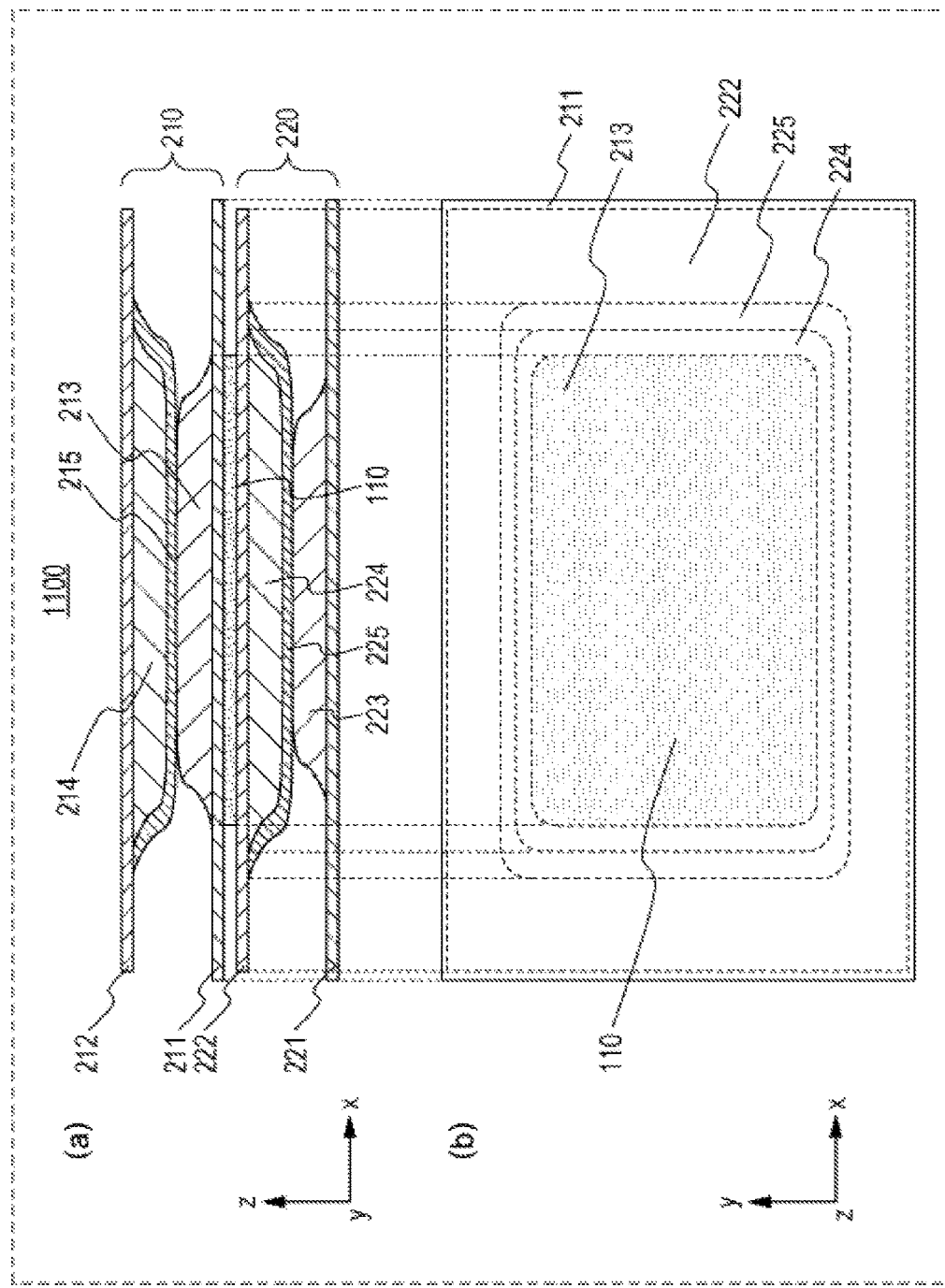
FIG. 2 is a view showing a schematic structure of a battery according to Embodiment 1.

FIG. 2 is a view showing a schematic structure of a battery 1100 according to Embodiment 1.

A part (a) of FIG. 2 is an x-z view (cross-sectional view) showing a schematic structure of the battery 1100 according to Embodiment 1.

A part (b) of FIG. 2 is an x-y view (plan perspective view) showing a schematic structure of the battery 1100 according to Embodiment 1.

In the battery 1100 according to Embodiment 1, the first adhesion layer 110 is disposed in the entire region in which the first positive electrode active material layer 213 and the second negative electrode active material layer 224 face each other.

According to the structure described above, by the first adhesion layer 110 formed in a wider region, the mechanical joint and the electrical connection between the first power generating element 210 and the second power generating element 220 can be more stabilized. In addition, by the first adhesion layer 110 formed in a wider region, the state in which the first positive electrode collector 211 and the second negative electrode collector 222 are not in contact with each other can be more reliably maintained. Hence, the electrical conduction state between the first positive electrode collector 211 and the second negative electrode collector 222 can be formed to have a lower resistance and can also be more stabilized.

In addition, in the example shown in FIG. 2, the region forming the first positive electrode active material layer 213 is included in the region forming the second negative electrode active material layer 224. Hence, the region in which the first positive electrode active material layer 213 and the second negative electrode active material layer 224 face each other is the same as the region forming the first positive electrode active material layer 213. Accordingly, in the example shown in FIG. 2, the first adhesion layer 110 is disposed in the entire region forming the first positive electrode active material layer 213.

Figure 3:
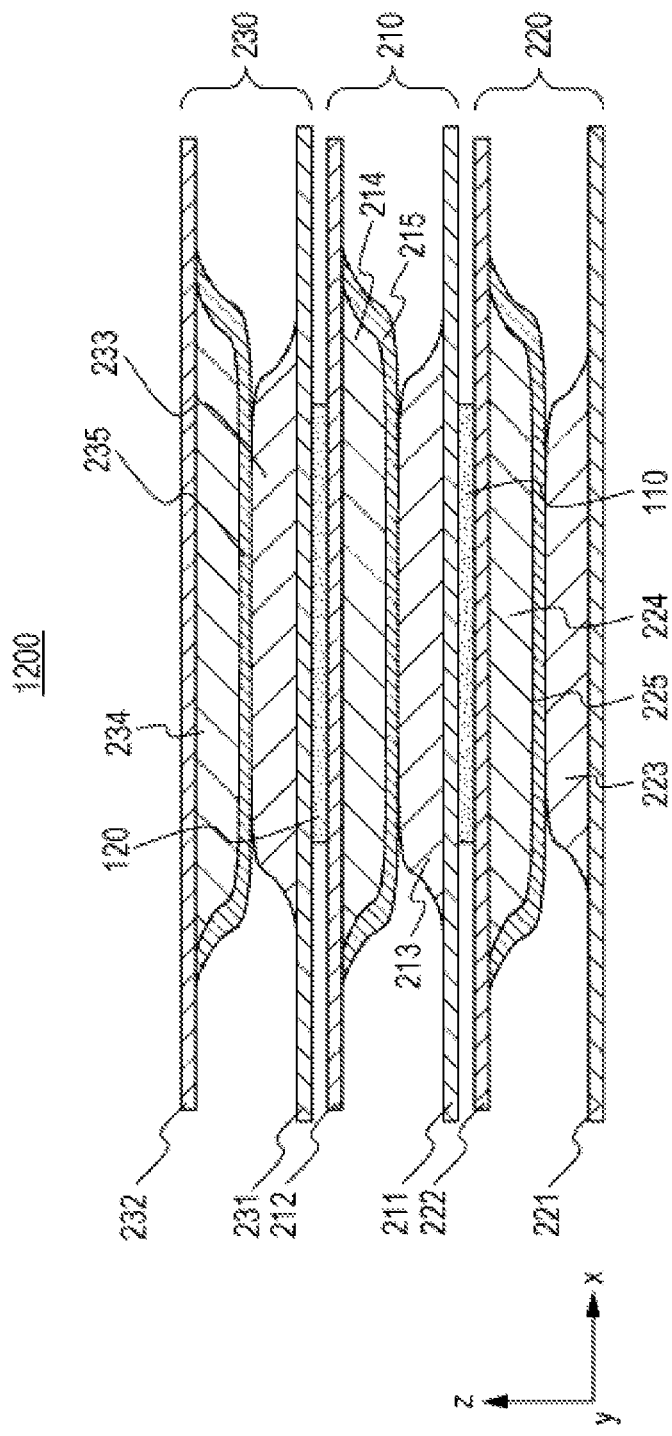
FIG. 3 is a cross-sectional view showing a schematic structure of a battery according to Embodiment 1.

FIG. 3 is a cross-sectional view showing a schematic structure of a battery 1200 according to Embodiment 1.

The battery 1200 according to Embodiment 1 further includes the following structure besides the above structure of the battery 1000 according to Embodiment 1.

That is, the battery 1200 according to Embodiment 1 includes a second adhesion layer 120 (e.g., adhesive layer) and a third power generating element 230.

The first power generating element 210 and the third power generating element 230 are laminated to each other.

The second adhesion layer 120 adheres the first power generating element 210 to the third power generating element 230.

The third power generating element 230 includes a third positive electrode collector 231, a third negative electrode collector 232, a third positive electrode active material layer 233, a third negative electrode active material layer 234, and a third solid electrolyte layer 235.

The third positive electrode active material layer 233 and the third negative electrode active material layer 234 are laminate to each other with (i.e., via) the third solid electrolyte layer 235 interposed therebetween.

The third positive electrode active material layer 233 is in contact with the third positive electrode collector 231. The third positive electrode active material layer 233 is disposed in a region smaller than that of the third positive electrode collector 231.

The third negative electrode active material layer 234 is in contact with the third negative electrode collector 232. The third positive electrode active material layer 233 is disposed in a region smaller than that of the third negative electrode collector 232.

The first negative electrode collector 212 faces the third positive electrode collector 231 with (i.e., via) the second adhesion layer 120 interposed therebetween.

The second adhesion layer 120 is disposed in the region forming the first negative electrode active material layer 214 or the third positive electrode active material layer 233, whichever is smaller, between the first negative electrode collector 212 and the third positive electrode collector 231.

The first negative electrode collector 212 and the third positive electrode collector 231 are not in contact with each other in the region in which the first negative electrode active material layer 214 and the third positive electrode active material layer 233 face each other.

According to the structure described above, while a strong adhesion and a stable electrical connection between the first power generating element 210 and the third power generating element 230 are realized, the probability of contact between the positive electrode collector and the negative electrode collector can be reduced. That is, at the end portion of the first negative electrode collector 212 and at an end portion of the third positive electrode collector 231, the thickness of the second adhesion layer 120 is not excessively large. Hence, the end portion of the first negative electrode collector 212 and the end portion of the third positive electrode collector 231 can be avoided from being deformed by the second adhesion layer 120. Accordingly, the proximity and the contact between the first negative electrode collector 212 and the first positive electrode collector 211 and the proximity and the contact between the third positive electrode collector 231 and the third negative electrode collector 232 can be prevented. Hence, for example, even in an all-solid-state battery in which no separators are provided between a positive electrode layer and a negative electrode layer, a risk in which the positive electrode layer and the negative electrode layer are short-circuited by a direct contact between the positive electrode collector and the negative electrode collector can be further reduced. In addition, degradation (such as generation of cracks) of the first negative electrode active material layer 214, the third positive electrode active material layer 233, and the solid electrolyte layer caused by the deformation of the end portion of the first negative electrode collector 212 and the end portion of the third positive electrode collector 231 can be prevented.

In addition, by the second adhesion layer 120, since the first negative electrode collector 212 and the third positive electrode collector 231 are not in contact with each other, the electrical conduction state between the first negative electrode collector 212 and the third positive electrode collector 231 can be formed to have a low resistance and can also be stabilized. Hence, by the low resistance of the electrical conduction state, for example, even when the first power generating element 210, the second power generating element 220, and the third power generating element 230 are charged or discharged by a large current, generation of voltage loss, heat, and the like can be suppressed. Furthermore, since the electrical conduction state is stabilized, for example, even by a long-term use, generation of corrosion of the first negative electrode collector 212 and the third positive electrode collector 231 can be suppressed.

In addition, as a material of the second adhesion layer 120, the material to be used for the first adhesion layer 110 may be used.

In addition, the second adhesion layer 120 may be formed from the same material, formed into the same shape, and formed in the same region as that of the first adhesion layer 110.

Alternatively, the second adhesion layer 120 may be formed from a different material, formed into a different shape, and formed in a different region from that of the first adhesion layer 110.

In addition, in Embodiment 1, the constituent elements (that Is, the positive electrode collector, the negative electrode collector, the positive electrode active material layer, the negative electrode active material layer, and the solid electrolyte layer) of the first power generating element 210, the second power generating element 220, and the third power generating element 230 may be respectively formed from the same materials or different materials and may be respectively formed in the same regions or different regions.

In addition, as shown in FIG. 3, the region forming the third positive electrode active material layer 233 may be smaller than the region forming the first negative electrode active material layer 214. In this case, the second adhesion layer 120 is disposed in the region forming the third positive electrode active material layer 233.

Alternatively, the region forming the third positive electrode active material layer 233 may be larger than the region forming the first negative electrode active material layer 214. In this case, the second adhesion layer 120 is disposed in the region forming the first negative electrode active material layer 214.

Alternatively, the region forming the third positive electrode active material layer 233 may be the same as the region forming the first negative electrode active material layer 214. In this case, the second adhesion layer 120 is disposed in the region forming the third positive electrode active material layer 233 (=the region forming the first negative electrode active material layer 214).

In addition, in Embodiment 1, as shown in FIG. 3, the second adhesion layer 120 is disposed in a region corresponding to 50% or more of the region forming the first negative electrode active material layer 214 or the region forming the third positive electrode active material layer 233, whichever is smaller.

According to the structure described above, by the second adhesion layer 120 formed in a wider region, the mechanical joint and the electrical connection between the first power generating element 210 and the third power generating element 230 can be more stabilized. In addition, by the second adhesion layer 120 formed in a wider region, the state in which the first negative electrode collector 212 and the third positive electrode collector 231 are not in contact with each other can be more reliably maintained. Hence, the electrical conduction state between the first negative electrode collector 212 and the third positive electrode collector 231 can be formed to have a lower resistance and can also be more stabilized.

Figure 4:
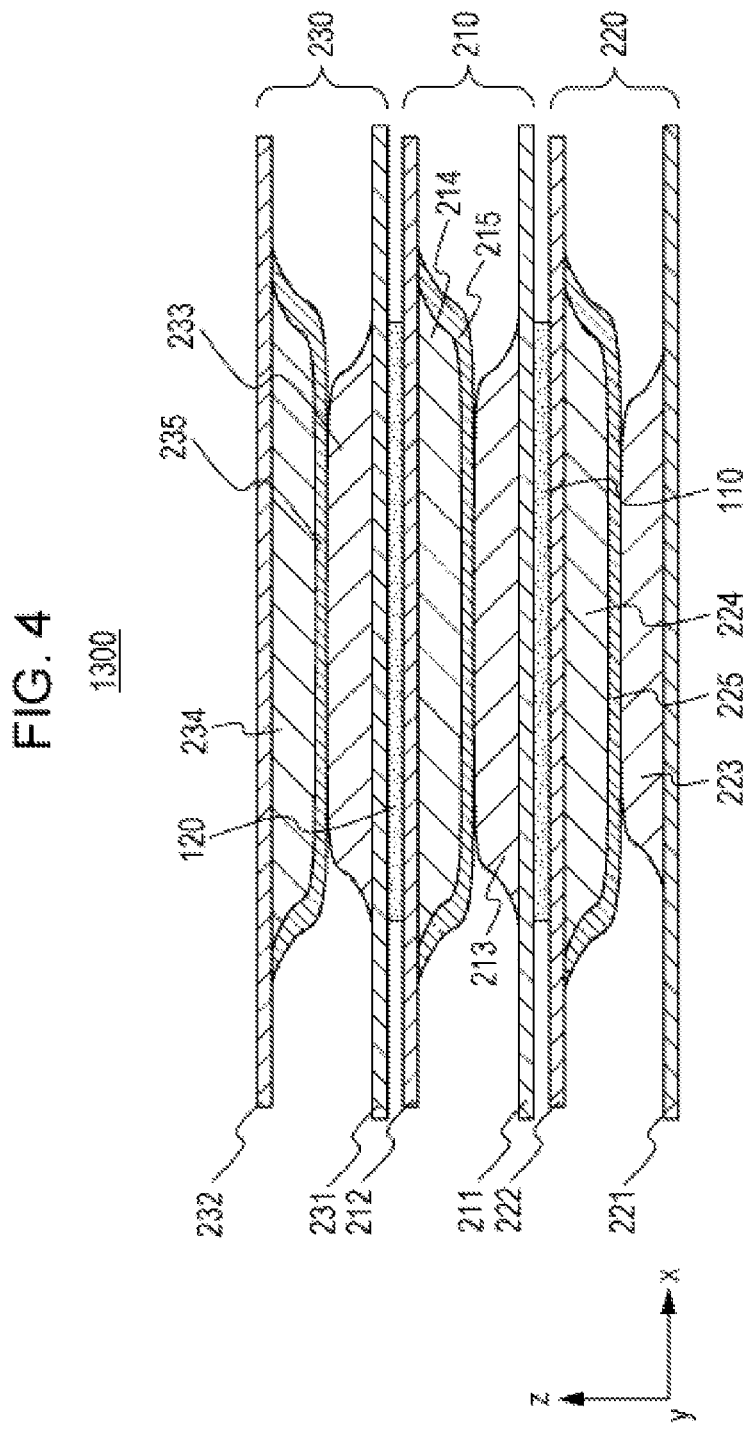
FIG. 4 is a cross-sectional view showing a schematic structure of a battery according to Embodiment 1.

FIG. 4 is a cross-sectional view showing a schematic structure of a battery 1300 according to Embodiment 1.

In the battery 1300 according to Embodiment 1, the second adhesion layer 120 is formed in the entire region in which the first negative electrode active material layer 214 and the third positive electrode active material layer 233 face each other.

According to the structure described above, by the second adhesion layer 120 formed in a wider region, the mechanical joint and the electrical connection between the first power generating element 210 and the third power generating element 230 can be more stabilized. In addition, by the second adhesion layer 120 formed in a wider region, the state in which the first negative electrode collector 212 and the third positive electrode collector 231 are not in contact with each other can be more reliably maintained. Hence, the electrical conduction state between the first negative electrode collector 212 and the third positive electrode collector 231 can be formed to have a lower resistance and can also be more stabilized.

In addition, in the example shown in FIG. 4, the region forming the third positive electrode active material layer 233 is included in the region forming the first negative electrode active material layer 214. Hence, the region in which the first negative electrode active material layer 214 and the third positive electrode active material layer 233 face each other is the same as the region forming the third positive electrode active material layer 233. Accordingly, in the example shown in FIG. 4, the second adhesion layer 120 is formed in the entire region forming the third positive electrode active material layer 233.

Figure 20:
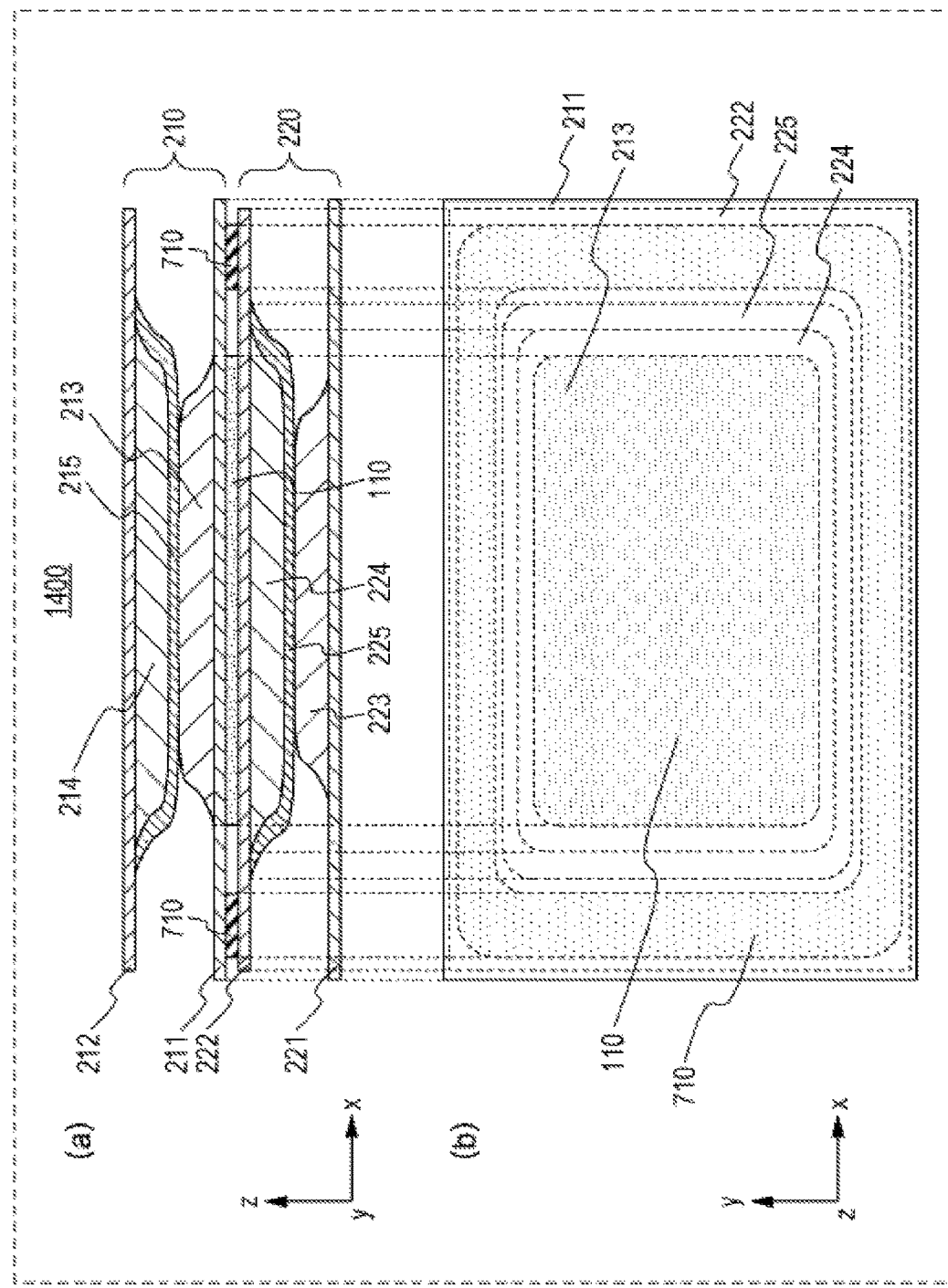
FIG. 20 is a view showing a schematic structure of a battery according to Embodiment 1.

FIG. 20 is a view showing a schematic structure of a battery 1400 according to Embodiment 1.

A part (a) of FIG. 20 is an x-z view (cross-sectional view) showing a schematic structure of the battery 1400 according to Embodiment 1.

A part (b) of FIG. 20 is an x-y view (plan perspective view) showing a schematic structure of the battery 1400 according to Embodiment 1.

The battery 1400 according to Embodiment 1 includes the following structure besides the structure of the above battery 1000 according to Embodiment 1.

That is, the battery 1400 according to Embodiment 1 includes a first space holding body 710 (e.g., gap holding body).

The first space holding body 710 is a member holding the space between the first power generating element 210 and the second power generating element 220.

The first space holding body 710 is disposed between the first positive electrode collector 211 and the second negative electrode collector 222 at a position at which the first adhesion layer 110 is not disposed.

According to the structure described above, by the first space holding body 710, the space between the first positive electrode collector 211 and the second negative electrode collector 222 can be held. Hence, at the position at which the first adhesion layer 110 is not disposed, the first positive electrode collector 211 and the second negative electrode collector 222 can be suppressed from being deformed (for example, being closer to or apart from each other). For example, even when the thickness of the first adhesion layer 110 is large, by the first space holding body 710, the first positive electrode collector 211 and the second negative electrode collector 222 can be suppressed from being deformed. Accordingly, generation of missing and the like of the active material and/or the solid electrolyte caused by the deformation of the first positive electrode collector 211 and/or the second negative electrode collector 222 can be suppressed.

In addition, in the battery 1400 according to Embodiment 1, as shown in FIG. 20, the first space holding body 710 may be disposed so as to surround (i.e., with surrounding) the periphery of the first adhesion layer 110.

According to the structure described above, by the first space holding body 710 surrounding the periphery of the first adhesion layer 110, the space between the first positive electrode collector 211 and the second negative electrode collector 222 can be more reliably held. As a result, generation of missing and the like of the active material and/or the solid electrolyte caused by the deformation of the first positive electrode collector 211 and/or the second negative electrode collector 222 can be further suppressed.

In addition, in the battery 1400 according to Embodiment 1, as shown in FIG. 20, the first space holding body 710 may be in contact with the first positive electrode collector 211 and the second negative electrode collector 222. For example, one principal surface (such as a part or the entire thereof) of the first space holding body 710 may be in close contact (for example, may be joined) with the first positive electrode collector 211. In this case, the other principal surface (such as a part or the entire thereof) of the first space holding body 710 may be in close contact (for example, may be joined) with the second negative electrode collector 222.

According to the structure described above, the spread of the first adhesion layer 110 can be blocked by the first space holding body 710. Accordingly, at the end portion of the first positive electrode collector 211 and at the end portion of the second negative electrode collector 222, the thickness of the first adhesion layer 110 can be more suppressed from being excessively increased. As a result, the end portion of the first positive electrode collector 211 and the end portion of the second negative electrode collector 222 can be more avoided from being deformed by the first adhesion layer 110.

In addition, as a material of the first space holding body 710, a material to be used as a generally known sealing agent may be used. The material of the first space holding body 710 may be, for example, a material (an insulating material) having no electrical conductivity. Alternatively, the first space holding body 710 may be at least one of a part (a convex portion) of the first positive electrode collector 211 and a part (a convex portion) of the second negative electrode collector 222.

Figure 21:
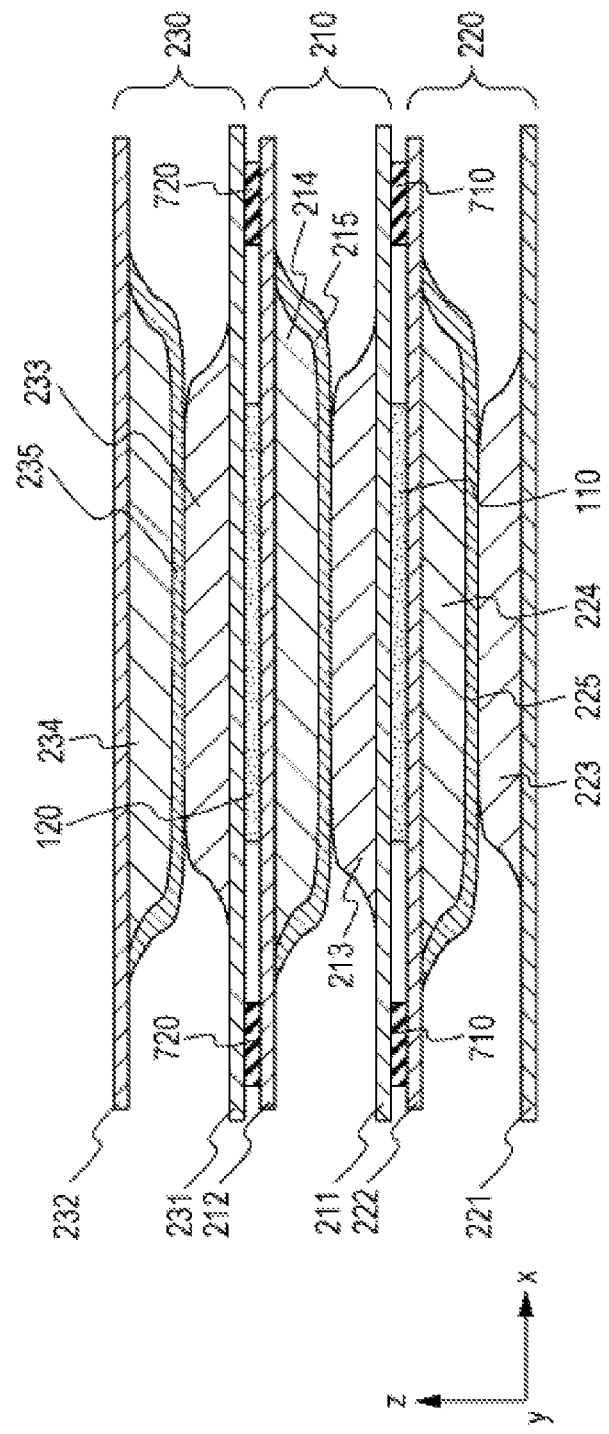
FIG. 21 is a cross-sectional view showing a schematic structure of a battery according to Embodiment 1.

FIG. 21 is a cross-sectional view showing a schematic structure of a battery 1500 according to Embodiment 1.

The battery 1500 according to Embodiment 1 further includes the following structure besides the structure of the battery 1400 according to Embodiment 1.

That is, the battery 1500 according to Embodiment 1 includes the second adhesion layer 120, the third power generating element 230, and a second space holding body 720 (e.g., gap holding body).

The second space holding body 720 is a member holding the space between the first power generating element 210 and the third power generating element 230.

The second space holding body 720 is disposed between the first negative electrode collector 212 and the third positive electrode collector 231 at a position at which the second adhesion layer 120 is not disposed.

According to the structure described above, by the second space holding body 720, the space between the first negative electrode collector 212 and the third positive electrode collector 231 can be held. Hence, at the position at which the second adhesion layer 120 is not disposed, the first negative electrode collector 212 and the third positive electrode collector 231 can be suppressed from being deformed (for example, being closer to or apart from each other). For example, even when the thickness of the second adhesion layer 120 is large, by the second space holding body 720, the first negative electrode collector 212 and the third positive electrode collector 231 can be suppressed from being deformed. As a result, generation of missing and the like of the active material and/or the solid electrolyte caused by the deformation of the first negative electrode collector 212 and/or the third positive electrode collector 231 can be suppressed.

In addition, in the battery 1500 according to Embodiment 1, as shown in FIG. 21, the second space holding body 720 may be disposed so as to surround (i.e., with surrounding) the periphery of the second adhesion layer 120.

According to the structure described above, by the second space holding body 720 which surrounds the periphery of the second adhesion layer 120, the space between the first negative electrode collector 212 and the third positive electrode collector 231 can be more reliably held. As a result, generation of missing and the like of the active material and/or the solid electrolyte caused by the deformation of the first negative electrode collector 212 and/or the third positive electrode collector 231 can be more suppressed.

In addition, in the battery 1500 according to Embodiment 1, as shown in FIG. 21, the second space holding body 720 may be in contact with the first negative electrode collector 212 and the third positive electrode collector 231. For example, one principal surface (such as a part or the entire thereof) of the second space holding body 720 may be in close contact (for example, may be joined) with the first negative electrode collector 212. In this case, the other principal surface (such as a part or the entire thereof) of the second space holding body 720 may be in close contact (for example, may be joined) with the third positive electrode collector 231.

According to the structure described above, the spread of the second adhesion layer 120 can be blocked by the second space holding body 720. Hence, at the end portion of the first negative electrode collector 212 and at the end portion of the third positive electrode collector 231, the thickness of the second adhesion layer 120 can be more suppressed from being excessively increased. As a result, the end portion of the first negative electrode collector 212 and the end portion of the third positive electrode collector 231 can be more avoided from being deformed by the second adhesion layer 120.

In addition, as a material of the second space holding body 720, the above material to be used for the first space holding body 710 may also be used. The material of the second space holding body 720 may be the same as or may be different from the material of the first space holding body 710.

In addition, in Embodiment 1, at least four power generating elements may be included. In this case, the adhesion layers may be provided at all the spaces between the at least four power generating elements.

In addition, in Embodiment 1, the power generating element may include a plurality of positive electrode active material layers, a plurality of negative electrode active material layers, and a plurality of solid electrolyte layers. In this case, the power generating element may have a bipolar laminate structure in which the positive electrode active material layers, the negative electrode active material layers, and the solid electrolyte layers are laminated to each other with (i.e., via) bipolar collectors interposed therebetween.

In addition, a battery manufacturing method according to Embodiment 1 will be described in the following Embodiment 2.

Embodiment 2

Hereinafter, Embodiment 2 will be described. Description duplicated with that of the above Embodiment 1 will be appropriately omitted.

Figure 5:
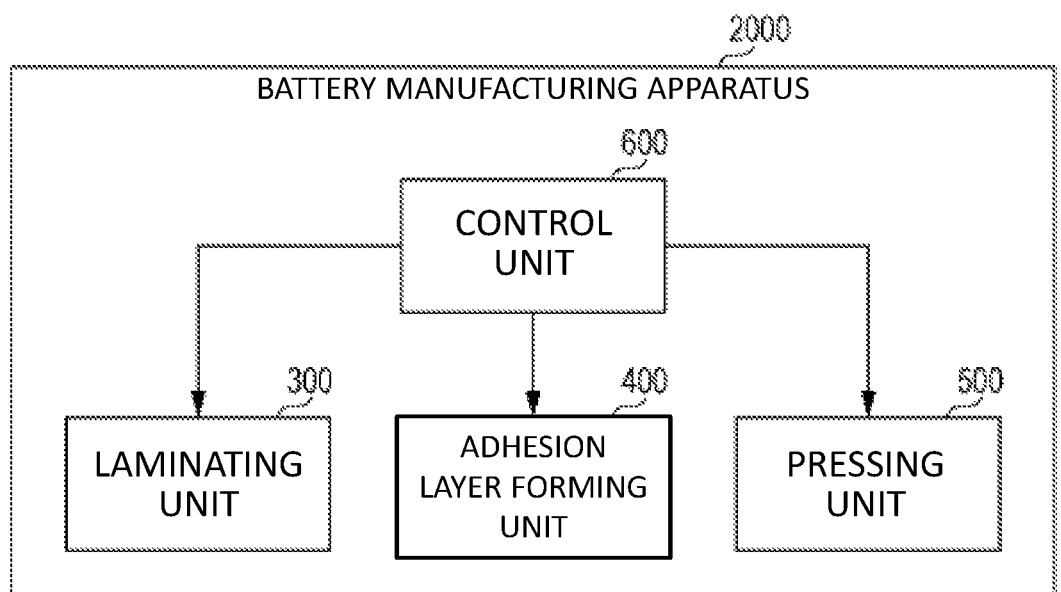
FIG. 5 is a view showing a schematic structure of a battery manufacturing apparatus according to Embodiment 2.

FIG. 5 is a view showing a schematic structure of a battery manufacturing apparatus 2000 according to Embodiment 2.

The battery manufacturing apparatus 2000 according to Embodiment 2 includes a laminating unit 300 and an adhesion layer forming unit 400.

The laminating unit 300 laminates the first power generating element 210 and the second power generating element 220.

The adhesion layer forming unit 400 forms the first adhesion layer 110 adhering the first power generating element 210 to the second power generating element 220.

The adhesion layer forming unit 400 forms the first adhesion layer 110 in the region forming the first positive electrode active material layer 213 or the region forming the second negative electrode active material layer 224, whichever is smaller, between the first positive electrode collector 211 and the second negative electrode collector 222.

In the state in which the first positive electrode collector 211 and the second negative electrode collector 222 face each other with (i.e., via) the first adhesion layer 110 interposed therebetween, and also in the state in which in the region in which the first positive electrode active material layer 213 and the second negative electrode active material layer 224 face each other, the first positive electrode collector 211 and the second negative electrode collector 222 are not in contact with each other, the laminating unit 300 laminates the first power generating element 210 and the second power generating element 220.

Figure 6:
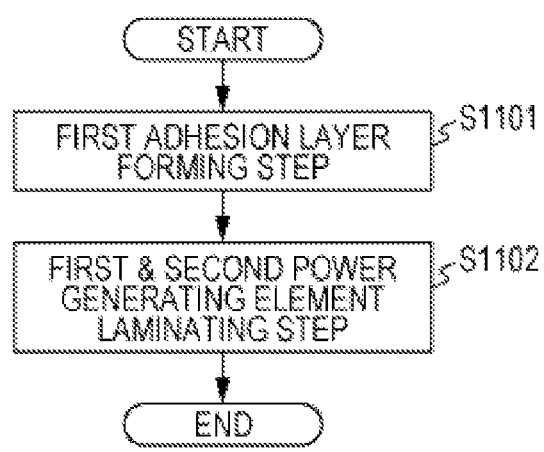
FIG. 6 is a flowchart showing a battery manufacturing method according to Embodiment 2.

FIG. 6 is a flowchart showing a battery manufacturing method according to Embodiment 2.

The battery manufacturing method according to Embodiment 2 is a battery manufacturing method using the battery manufacturing apparatus 2000 according to Embodiment 2. For example, the battery manufacturing method according to Embodiment 2 is a battery manufacturing method performed by the battery manufacturing apparatus 2000 according to Embodiment 2.

The battery manufacturing method according to Embodiment 2 includes a first adhesion layer forming step S1101 (=Step (a)) and a first & second power generating element laminating step S1102 (=Step (b)).

The first adhesion layer forming step S1101 is a step of forming the first adhesion layer 110 adhering the first power generating element 210 to the second power generating element 220 by the adhesion layer forming unit 400.

The first & second power generating element laminating step S1102 is a step of laminating the first power generating element 210 and the second power generating element 220 by the laminating unit 300.

In the first adhesion layer forming step S1101, by the adhesion layer forming unit 400, the first adhesion layer 110 is formed in the region forming the first positive electrode active material layer 213 or the region forming the second negative electrode active material layer 224, whichever is smaller, between the first positive electrode collector 211 and the second negative electrode collector 222.

In the first & second power generating element laminating step S1102, in the state in which the first positive electrode collector 211 and the second negative electrode collector 222 face each other with (i.e., via) the first adhesion layer 110 interposed therebetween and also in the state in which in the region in which the first positive electrode active material layer 213 and the second negative electrode active material layer 224 face each other, the first positive electrode collector 211 and the second negative electrode collector 222 are not in contact with each other, by the laminating unit 300, the first power generating element 210 and the second power generating element 220 are laminated to each other.

By the manufacturing apparatus or the manufacturing method described above, the battery according to Embodiment 1 can be manufactured.

By the manufacturing apparatus or the manufacturing method described above, in manufacturing of the battery, while a strong adhesion and a stable electrical connection between the first power generating element 210 and the second power generating element 220 are realized, the probability of contact between the positive electrode collector and the negative electrode collector can be reduced. That is, in manufacturing of the battery (for example, in a pressing step), at the end portion of the first positive electrode collector 211 and at the end portion of the second negative electrode collector 222, the thickness of the first adhesion layer 110 is not excessively increased. Hence, the end portion of the first positive electrode collector 211 and the end portion of the second negative electrode collector 222 can be avoided from being deformed by the first adhesion layer 110. Accordingly, the proximity and the contact between the first positive electrode collector 211 and the first negative electrode collector 212 and the proximity and the contact between the second positive electrode collector 221 and the second negative electrode collector 222 can be prevented. Hence, for example, even when an all-solid-state battery is manufactured in which no separators are provided between a positive electrode layer and a negative electrode layer, a risk in which the positive electrode layer and the negative electrode layer are short-circuited by a direct contact between the positive electrode collector and the negative electrode collector can be reduced. In addition, degradation (such as generation of cracks) of the first positive electrode active material layer 213, the second negative electrode active material layer 224, and the solid electrolyte layer caused by the deformation of the end portion of the first positive electrode collector 211 and the end portion of the second negative electrode collector 222 can be prevented.

In addition, since the first positive electrode collector 211 and the second negative electrode collector 222 are not in contact with each other by the first adhesion layer 110, the electrical conduction state between the first positive electrode collector 211 and the second negative electrode collector 222 can be formed to have a low resistance and can also be stabilized. Hence, since the electrical conduction state can be formed to have a low resistance, for example, even when the first power generating element 210 and the second power generating element 220 are charged or discharged by a large current, generation of voltage loss, heat, and the like can be suppressed. Furthermore, since the electrical conduction state is stabilized, for example, even by a long-term use, generation of corrosion of the first positive electrode collector 211 and the second negative electrode collector 222 can be suppressed.

In addition, in the battery manufacturing apparatus 2000 according to Embodiment 2, the adhesion layer forming unit 400 may form the first adhesion layer 110 in a region corresponding to 50% or more of the region forming the first positive electrode active material layer 213 or the region forming the second negative electrode active material layer 224, whichever is smaller.

In other words, in the battery manufacturing method according to Embodiment 2, in the first adhesion layer forming step S1101, the first adhesion layer 110 may be formed by the adhesion layer forming unit 400 in a region corresponding to 50% or more of the region forming the first positive electrode active material layer 213 or the region forming the second negative electrode active material layer 224, whichever is smaller.

By the manufacturing apparatus or the manufacturing method described above, the first adhesion layer 110 can be formed in a wider region. Accordingly, the mechanical joint and the electrical connection between the first power generating element 210 and the second power generating element 220 can be more stabilized. In addition, by the first adhesion layer 110 formed in a wider region, the state in which the first positive electrode collector 211 and the second negative electrode collector 222 are not in contact with each other can be more reliably maintained. Hence, the electrical conduction state between the first positive electrode collector 211 and the second negative electrode collector 222 can be formed to have a lower resistance and can also be more stabilized.

In addition, in the battery manufacturing apparatus 2000 according to Embodiment 2, the adhesion layer forming unit 400 may form the first adhesion layer 110 in the entire region in which the first positive electrode active material layer 213 and the second negative electrode active material layer 224 face each other.

In other words, in the battery manufacturing method according to Embodiment 2, in the first adhesion layer forming step S1101, by the adhesion layer forming unit 400, the first adhesion layer 110 may be formed in the entire region in which the first positive electrode active material layer 213 and the second negative electrode active material layer 224 face each other.

By the manufacturing apparatus or the manufacturing method described above, the first adhesion layer 110 can be formed in a wider region. Accordingly, the mechanical joint and the electrical connection between the first power generating element 210 and the second power generating element 220 can be more stabilized. In addition, by the first adhesion layer 110 formed in a wider region, the state in which the first positive electrode collector 211 and the second negative electrode collector 222 are not in contact with each other can be more reliably maintained. Hence, the electrical conduction state between the first positive electrode collector 211 and the second negative electrode collector 222 can be formed to have a lower resistance and can also be more stabilized.

Figure 7:
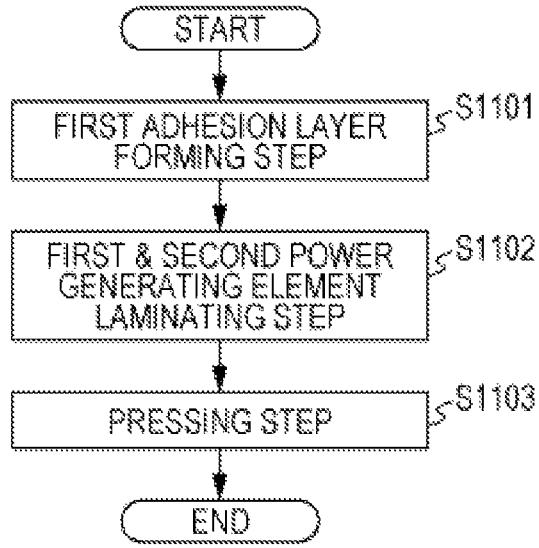
FIG. 7 is a flowchart showing a modified example of the battery manufacturing method according to Embodiment 2.

FIG. 7 is a flowchart showing a modified example of the battery manufacturing method according to Embodiment 2.

The battery manufacturing apparatus 2000 according to Embodiment 2 may further include a pressing unit 500 as shown in FIG. 5.

The pressing unit 500 presses the first power generating element 210 and the second power generating element 220 after the first adhesion layer 110 is formed between the first positive electrode collector 211 and the second negative electrode collector 222.

In other words, the battery manufacturing method according to Embodiment 2 may further include a pressing step S1103 (=Step (c)).

The pressing step S1103 is a step of pressing the first power generating element 210 and the second power generating element 220 by the pressing unit 500 after the first adhesion layer 110 is formed between the first positive electrode collector 211 and the second negative electrode collector 222.

By the manufacturing apparatus or the manufacturing method described above, the first adhesion layer 110 can be pressed by pressure application together with the first power generating element 210 and the second power generating element 220. Accordingly, for example, the first adhesion layer 110 can be thinly and uniformly spread in a wide region. Hence, the adhesion force and the electrical conductivity of the first adhesion layer 110 can be more increased. As a result, while the first power generating element 210 and the second power generating element 220 are more tightly adhered to each other, the first adhesion layer 110 is suppressed from being formed into a high resistance layer.

Figure 8:
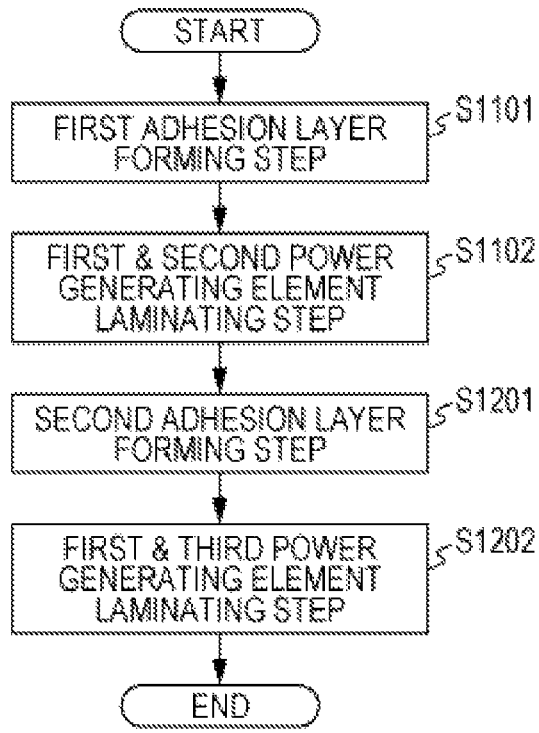
FIG. 8 is a flowchart showing a modified example of the battery manufacturing method according to Embodiment 2.

FIG. 8 is a flowchart showing a modified example of the battery manufacturing method according to Embodiment 2.

In the battery manufacturing apparatus 2000 according to Embodiment 2, the laminating unit 300 may laminate the first power generating element 210 and the third power generating element 230.

The adhesion layer forming unit 400 may form the second adhesion layer 120 adhering the first power generating element 210 to the third power generating element 230.

The adhesion layer forming unit 400 may form the second adhesion layer 120 in the region forming the first negative electrode active material layer 214 and the third positive electrode active material layer 233, whichever is smaller, between the first negative electrode collector 212 and the third positive electrode collector 231.

In the state in which the first negative electrode collector 212 and the third positive electrode collector 231 face each other with (i.e., via) the second adhesion layer 120 interposed therebetween, and also in the state in which in the region in which the first negative electrode active material layer 214 and the third positive electrode active material layer 233 face each other, the first negative electrode collector 212 and the third positive electrode collector 231 are not in contact with each other, the laminating unit 300 may laminate the first power generating element 210 and the third power generating element 230.

In other words, the battery manufacturing method according to Embodiment 2 may further include a second adhesion layer forming step S1201 (=Step (d)) and a first & third power generating element laminating step S1202 (Step (e)).

The second adhesion layer forming step S1201 is a step of forming the second adhesion layer 120 adhering the first power generating element 210 to the third power generating element 230 by the adhesion layer forming unit 400.

The first & third power generating element laminating step S1202 is a step of laminating the first power generating element 210 and the third power generating element 230 by the laminating unit 300.

In the second adhesion layer forming step S1201, the second adhesion layer 120 may be formed by the adhesion layer forming unit 400 in the region forming the first negative electrode active material layer 214 or the region forming the third positive electrode active material layer 233, whichever is smaller, between the first negative electrode collector 212 and the third positive electrode collector 231.

In the first & third power generating element laminating step S1202, in the state in which the first negative electrode collector 212 and the third positive electrode collector 231 face each other with (i.e., via) the second adhesion layer 120 interposed therebetween, and also in the state in which in the region in which the first negative electrode active material layer 214 and the third positive electrode active material layer 233 face each other, the first negative electrode collector 212 and the third positive electrode collector 231 are not in contact with each other, the first power generating element 210 and the third power generating element 230 may be laminated to each other by the laminating unit 300.

By the manufacturing apparatus or the manufacturing method described above, in manufacturing of the battery, while a strong adhesion and a stable electrical connection between the first power generating element 210 and the third power generating element 230 are realized, the probability of contact between the positive electrode collector and the negative electrode collector can be reduced. That is, in manufacturing of the battery (for example, in a pressing step), at the end portion of the first negative electrode collector 212 and at the end portion of the third positive electrode collector 231, the thickness of the second adhesion layer 120 is not excessively increased. Hence, the end portion of the first negative electrode collector 212 and the end portion of the third positive electrode collector 231 can be avoided from being deformed by the second adhesion layer 120. Accordingly, the proximity and the contact between the first negative electrode collector 212 and the first positive electrode collector 211 and the proximity and the contact between the third positive electrode collector 231 and the third negative electrode collector 232 can be prevented. As a result, for example, even when an all-solid-state battery is manufactured in which no separators are provided between a positive electrode layer and a negative electrode layer, a risk in which the positive electrode layer and the negative electrode are short-circuited by a direct contact between the positive electrode collector and the negative electrode collector can be more reduced. In addition, degradation (such as generation of cracks) of the first negative electrode active material layer 214, the third positive electrode active material layer 233, and the solid electrolyte layer caused by the deformation of the end portion of the first negative electrode collector 212 and the end portion of the third positive electrode collector 231 can be prevented.

In addition, since the first negative electrode collector 212 and the third positive electrode collector 231 are not in contact with each other by the second adhesion layer 120, the electrical conduction state between the first negative electrode collector 212 and the third positive electrode collector 231 can be formed to have a low resistance and can also be stabilized. Hence, since the electrical conduction state is formed to have a low resistance, for example, even when the first power generating element 210, the second power generating element 220, and the third power generating element 230 are charged or discharged by a large current, generation of voltage loss, heat, and the like can be suppressed. Furthermore, since the electrical conduction state is stabilized, for example, even by a long-term use, generation of corrosion of the first negative electrode collector 212 and the third positive electrode collector 231 can be suppressed.

In addition, in the battery manufacturing apparatus 2000 according to Embodiment 2, the adhesion layer forming unit 400 may form the second adhesion layer 120 in a region corresponding to 50% or more of the region forming the first negative electrode active material layer 214 or the region forming the third positive electrode active material layer 233, whichever is smaller.

In other words, in the battery manufacturing method according to Embodiment 2, in the second adhesion layer forming step S1201, the second adhesion layer 120 may be formed by the adhesion layer forming unit 400 in a region corresponding to 50% or more of the region forming the first negative electrode active material layer 214 or the region forming the third positive electrode active material layer 233, whichever is smaller.

By the manufacturing apparatus or the manufacturing method described above, the second adhesion layer 120 may be formed in a wider region. Accordingly, the mechanical joint and the electrical connection between the first power generating element 210 and the third power generating element 230 can be more stabilized. In addition, by the second adhesion layer 120 formed in a wider region, the state in which the first negative electrode collector 212 and the third positive electrode collector 231 are not in contact with each other can be more reliably maintained. As a result, the electrical conduction state between the first negative electrode collector 212 and the third positive electrode collector 231 can be formed to have a lower resistance and can also be more stabilized.

In addition, in the battery manufacturing apparatus 2000 according to Embodiment 2, the adhesion layer forming unit 400 may form the second adhesion layer 120 in the entire region in which the first negative electrode active material layer 214 and the third positive electrode active material layer 233 face each other.

In other words, in the battery manufacturing method according to Embodiment 2, in the second adhesion layer forming step S1201, the second adhesion layer 120 may be formed by the adhesion layer forming unit 400 in the entire region in which the first negative electrode active material layer 214 and the third positive electrode active material layer 233 face each other.

By the manufacturing apparatus or the manufacturing method described above, the second adhesion layer 120 may be formed in a wider region. Accordingly, the mechanical joint and the electrical connection between the first power generating element 210 and the third power generating element 230 can be more stabilized. In addition, by the second adhesion layer 120 formed in a wider region, the state in which the first negative electrode collector 212 and the third positive electrode collector 231 are not in contact with each other can be more reliably maintained. As a result, the electrical conduction state between the first negative electrode collector 212 and the third positive electrode collector 231 can be formed to have a lower resistance and can also be more stabilized.

Figure 9:
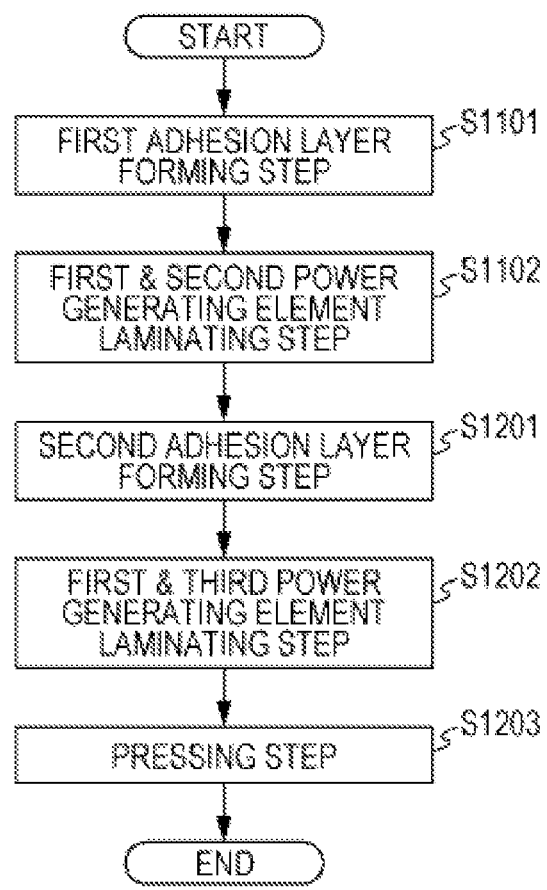
FIG. 9 is a flowchart showing a modified example of the battery manufacturing method according to Embodiment 2.

FIG. 9 is a flowchart showing a modified example of the battery manufacturing method according to Embodiment 2.

In the battery manufacturing apparatus 2000 according to Embodiment 2, the pressing unit 500 may press the first power generating element 210, the second power generating element 220, and the third power generating element 230.

After the first adhesion layer 110 is formed between the first positive electrode collector 211 and the second negative electrode collector 222, and the second adhesion layer 120 is formed between the first negative electrode collector 212 and the third positive electrode collector 231, the pressing unit 500 may press the first power generating element 210, the second power generating element 220, and the third power generating element 230.

In other words, the battery manufacturing method according to Embodiment 2 may further include a pressing step S1203 (=Step (f)).

The pressing step S1203 is a step of pressing the first power generating element 210, the second power generating element 220, and the third power generating element 230 by the pressing unit 500 after the first adhesion layer 110 is formed between the first positive electrode collector 211 and the second negative electrode collector 222, and the second adhesion layer 120 is formed between the first negative electrode collector 212 and the third positive electrode collector 231.

By the manufacturing apparatus or the manufacturing method described above, the second adhesion layer 120 may be formed in a wider region. Accordingly, the mechanical joint and the electrical connection between the first power generating element 210 and the third power generating element 230 can be more stabilized. In addition, by the second adhesion layer 120 formed in a wider region, the state in which the first negative electrode collector 212 and the third positive electrode collector 231 are not in contact with each other can be more reliably maintained. As a result, the electrical conduction state between the first negative electrode collector 212 and the third positive electrode collector 231 can be formed to have a lower resistance and can also be more stabilized.

In addition, in Embodiment 2, as the first power generating element 210, the second power generating element 220, and the third power generating element 230, power generating elements prepared in advance (power generating elements formed already) may also be used.

In this case, the laminating unit 300 may include a transporting mechanism (such as a roller) transporting a power generating element to be laminated.

In this case, for example, after transporting the first power generating element 210 prepared in advance, the laminating unit 300 may laminate the first power generating element 210 on the second power generating element 220 prepared in advance. Furthermore, for example, after transporting the third power generating element 230 prepared in advance, the laminating unit 300 may laminate the third power generating element 230 on the laminate formed of the first power generating element 210 and the second power generating element 220.

Alternatively, the first power generating element 210, the second power generating element 220, and the third power generating element 230 each may be formed by the manufacturing apparatus and the manufacturing method according to Embodiment 2.

In this case, the laminating unit 300 may include a power generating element forming unit forming the positive electrode active material layer, the solid electrolyte layer, and the negative electrode active material layer on the collectors. The power generating element forming unit may include a coating mechanism coating an active material or a solid electrolyte which is a coating agent. The power generating element forming unit may include, for example, an ejecting mechanism (such as an ejecting port) ejecting the coating agent, a supplying mechanism (such as a tank and a supply pipe) supplying the coating agent to the ejecting mechanism, and a transporting mechanism (such as a roller) transporting a collector or the like to be coated.

In this case, the laminating unit 300 may form the first power generating element 210 by the power generating element forming unit, for example, on the second power generating element 220 prepared in advance. Furthermore, the laminating unit 300 may form the third power generating element 230 by the power generating element forming unit, for example, on the laminate formed of the first power generating element 210 and the second power generating element 220.

In addition, in Embodiment 2, the adhesion layer forming unit 400 may include a coating mechanism coating an adhesive which is a coating agent. The adhesion layer forming unit 400 may include, for example, an ejecting mechanism (such as an ejecting port) ejecting the coating agent, a supplying mechanism (such as a tank and a supply pipe) supplying the coating agent to the ejecting mechanism, and a transporting mechanism (such as a roller) transporting a power generating element to be coated.

In addition, in Embodiment 2, as an adhesion layer forming method (a method for applying an adhesive), a generally known method, such as screen printing, die coating, ink jet printing, or coating using a dispenser, may be appropriately used in accordance with an adhesive material.

In addition, in Embodiment 2, the shape of the adhesive to be formed when being applied may be any one of a flat, a line, and a dot shape. Since the pressure is applied on the adhesive, regardless of the shape of the adhesive to be formed when being applied, the adhesive is flatly spread into an adhesion layer.

In addition, in Embodiment 2, the pressing unit 500 may include, for example, a pressing mechanism (such as a press stage and a cylinder) pressing a power generating element by pressure application and a transporting mechanism (such as a roller) transporting a power generating element to be pressed.

For the mechanisms described above to be included in the laminating unit 300, the adhesion layer forming unit 400, and the pressing unit 500, generally known devices and members may be appropriately used.

In addition, the battery manufacturing apparatus 2000 according to Embodiment 2 may further include a control unit 600 as shown in FIG. 5.

The control unit 600 controls the operation of the laminating unit 300, the adhesion layer forming unit 400, and the pressing unit 500.

The control unit 600 may be formed, for example, of a processor and a memory. The processor may be, for example, a central processing unit (CPU) or a micro-processing unit (MPU). In this case, the processor may perform a control method (battery manufacturing method) disclosed in the present disclosure by reading of a program stored in the memory.

Figure 22:
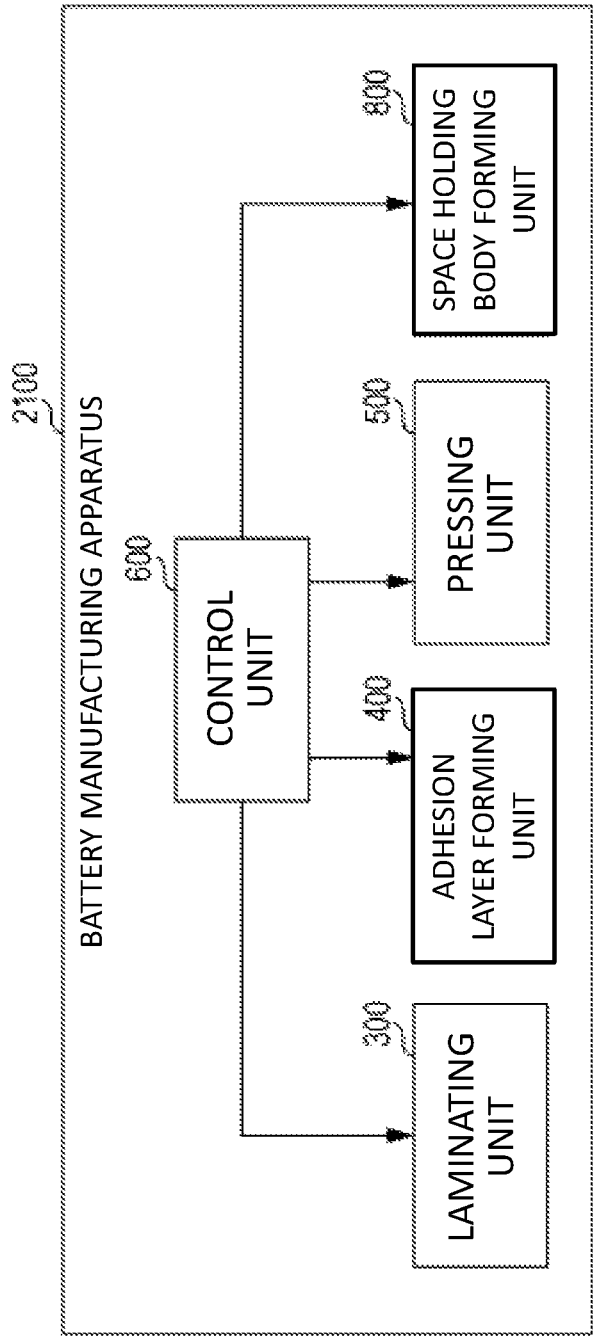
FIG. 22 is a view showing a schematic structure of a battery manufacturing apparatus according to Embodiment 2.

FIG. 22 is a view showing a schematic structure of a battery manufacturing apparatus 2100 according to Embodiment 2.

The battery manufacturing apparatus 2100 according to Embodiment 2 further includes the following structure besides the structure of the above battery manufacturing apparatus 2000 according to Embodiment 2.

That is, the battery manufacturing apparatus 2100 according to Embodiment 2 includes a space holding body forming unit 800.

The space holding body forming unit 800 forms the first space holding body 710. The space holding body forming unit 800 forms the first space holding body 710 between the first positive electrode collector 211 and the second negative electrode collector 222 at a position at which the first adhesion layer 110 is not disposed.

Figure 23:
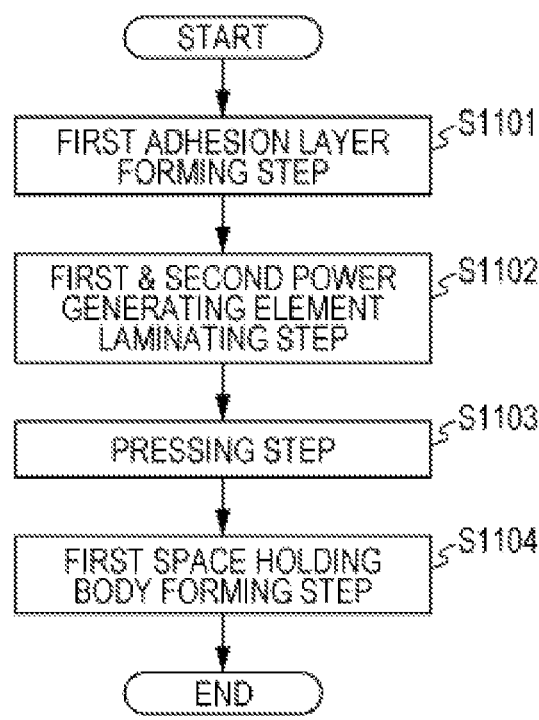
FIG. 23 is a flowchart showing a modified example of the battery manufacturing method according to Embodiment 2.

FIG. 23 is a flowchart showing a modified example of the battery manufacturing method according to Embodiment 2.

The battery manufacturing method shown in FIG. 23 further includes a first space holding body forming step S1104 (=Step (g)) besides the battery manufacturing method shown in FIG. 7.

The first space holding body forming step S1104 is a step of forming the first space holding body 710 by the space holding body forming unit 800 so as to hold the space between the first power generating element 210 and the second power generating element 220.

In the first space holding body forming step S1104, by the space holding body forming unit 800, the first space holding body 710 is formed between the first positive electrode collector 211 and the second negative electrode collector 222 at a position at which the first adhesion layer 110 is not disposed.

By the manufacturing method described above, for example, the above battery 1400 shown in FIG. 20 is formed.

By the manufacturing apparatus or the manufacturing method described above, in manufacturing of the battery, the space between the first positive electrode collector 211 and the second negative electrode collector 222 can be held by the first space holding body 710. Hence, the first positive electrode collector 211 and the second negative electrode collector 222 are suppressed from being deformed (for example, being closer to or apart from each other) at the position at which the first adhesion layer 110 is not disposed. For example, even when the thickness of the first adhesion layer 110 is large, the first positive electrode collector 211 and the second negative electrode collector 222 can be suppressed by the first space holding body 710 from being deformed. As a result, generation of missing and the like of the active material and/or the solid electrolyte caused by the deformation of the first positive electrode collector 211 and/or the second negative electrode collector 222 can be suppressed.

In addition, in the battery manufacturing apparatus 2100 according to Embodiment 2, the space holding body forming unit 800 may form the first space holding body 710 so as to surround (i.e., with surrounding) the periphery of the first adhesion layer 110.

In other words, in the battery manufacturing method according to Embodiment 2, in the first space holding body forming step S1104, the first space holding body 710 may be formed by the space holding body forming unit 800 so as to surround (i.e., with surrounding) the periphery of the first adhesion layer 110.

By the manufacturing apparatus or the manufacturing method described above, in manufacturing of the battery, by the first space holding body 710 surrounding the periphery of the first adhesion layer 110, the space between the first positive electrode collector 211 and the second negative electrode collector 222 can be more reliably held. Hence, generation of missing and the like of the active material and/or the solid electrolyte caused by the deformation of the first positive electrode collector 211 and/or the second negative electrode collector 222 can be more suppressed.

In addition, in the battery manufacturing method according to Embodiment 2, the first space holding body forming step S1104 may be a step to be performed after the first adhesion layer forming step S1101, the first & second power generating element laminating step S1102, and the pressing step S1103 are all performed. Alternatively, the first space holding body forming step S1104 may be a step to be performed between any two steps among the first adhesion layer forming step S1101, the first & second power generating element laminating step S1102, and the pressing step S1103.

Figure 24:
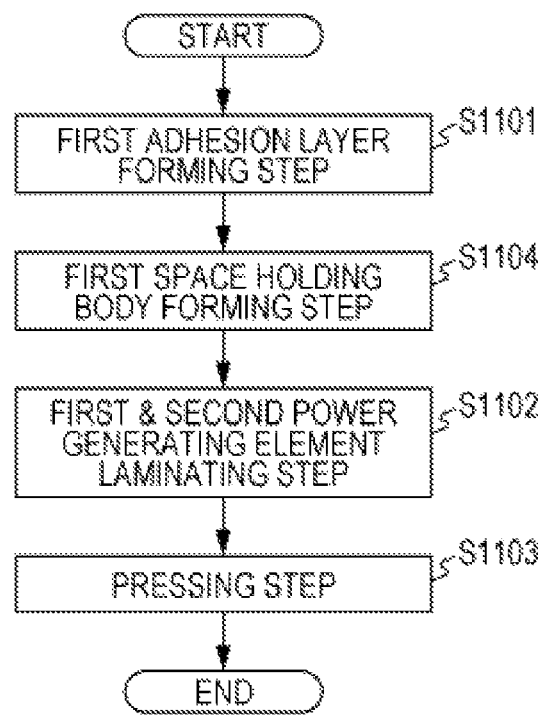
FIG. 24 is a flowchart showing a modified example of the battery manufacturing method according to Embodiment 2.

FIG. 24 is a flowchart showing a modified example of the battery manufacturing method according to Embodiment 2.

As shown in FIG. 24, in the battery manufacturing method according to Embodiment 2, the first space holding body forming step S1104 may be performed after the first adhesion layer forming step S1101 is performed. In this case, the first & second power generating element laminating step S1102 may be performed after the first space holding body forming step S1104 is performed.

In this case, in the first & second power generating element laminating step S1102, the first space holding body 710 may be in contact with the first positive electrode collector 211 and the second negative electrode collector 222. For example, one principal surface (such as a part or the entire thereof) of the first space holding body 710 may be in close contact (for example, may be joined) with the first positive electrode collector 211. In this case, the other principal surface (such as a part or the entire thereof) of the first space holding body 710 may be in close contact (for example, may be joined) with the second negative electrode collector 222.

By the manufacturing apparatus or the manufacturing method described above, in manufacturing of the battery, the spread of the first adhesion layer 110 can be blocked by the first space holding body 710. Accordingly, at the end portion of the first positive electrode collector 211 and at the end portion of the second negative electrode collector 222, the thickness of the first adhesion layer 110 can be more suppressed from being excessively increased. As a result, the end portion of the first positive electrode collector 211 and the end portion of the second negative electrode collector 222 can be more avoided from being deformed by the first adhesion layer 110.

In addition, the space holding body forming unit 800 may form the second space holding body 720. The space holding body forming unit 800 may form the second space holding body 720 between the first negative electrode collector 212 and the third positive electrode collector 231 at a position at which the second adhesion layer 120 is not disposed.

Figure 25:
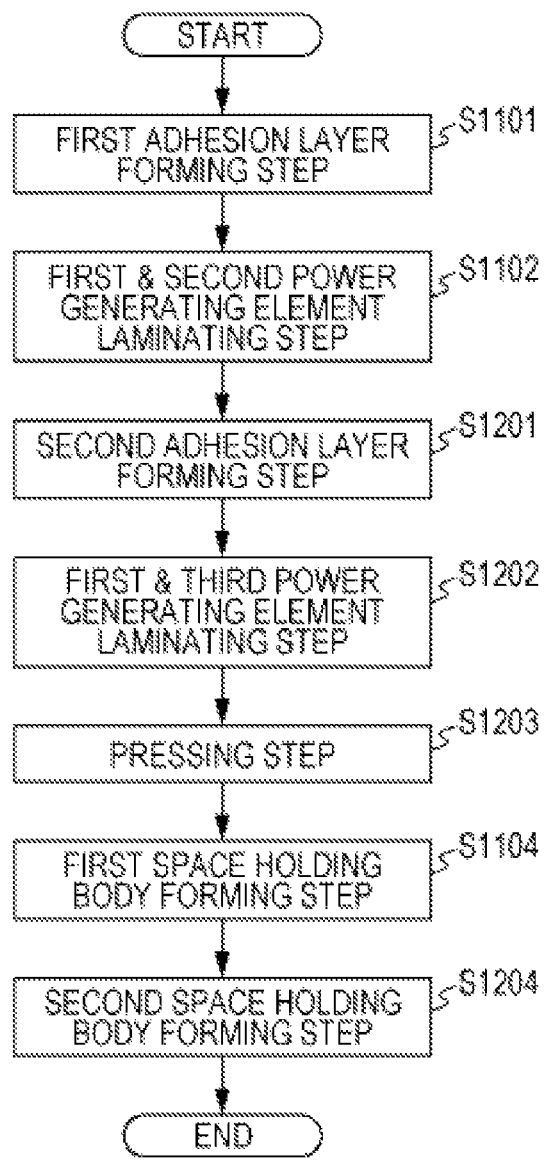
FIG. 25 is a flowchart showing a modified example of the battery manufacturing method according to Embodiment 2.

FIG. 25 is a flowchart showing a modified example of the battery manufacturing method according to Embodiment 2.

The battery manufacturing method shown in FIG. 25 includes, besides the battery manufacturing method shown in FIG. 9, the first space holding body forming step S1104 (=Step (g)) and a second space holding body forming step S1204 (=Step (h)).

The second space holding body forming step S1204 is a step of forming the second space holding body 720 by the space holding body forming unit 800 between the first power generating element 210 and the third power generating element 230.

In the second space holding body forming step S1204, the second space holding body 720 is formed by the space holding body forming unit 800 between the first negative electrode collector 212 and the third positive electrode collector 231 at a position at which the second adhesion layer 120 is not disposed.

By the manufacturing method described above, for example, the above battery 1500 shown in FIG. 21 is formed.

By the manufacturing apparatus or the manufacturing method described above, in manufacturing of the battery, the space between the first negative electrode collector 212 and the third positive electrode collector 231 can be held. Hence, the first negative electrode collector 212 and the third positive electrode collector 231 are suppressed from being deformed (for example, being closer to or apart from each other) at the position at which the second adhesion layer 120 is not disposed. For example, even when the thickness of the second adhesion layer 120 is large, the first negative electrode collector 212 and the third positive electrode collector 231 can be suppressed by the second space holding body 720 from being deformed. As a result, generation of missing and the like of the active material and/or the solid electrolyte caused by the deformation of the first negative electrode collector 212 and/or the third positive electrode collector 231 can be suppressed.

In addition, in the battery manufacturing apparatus 2100 according to Embodiment 2, the space holding body forming unit 800 may form the second space holding body 720 so as to surround (i.e., with surrounding) the periphery of the second adhesion layer 120.

In other words, in the battery manufacturing method according to Embodiment 2, in the second space holding body forming step S1204, the second space holding body 720 may be formed by the space holding body forming unit 800 so as to surround (i.e., with surrounding) the periphery of the second adhesion layer 120.

By the manufacturing apparatus or the manufacturing method described above, in manufacturing of the battery, the space between the first negative electrode collector 212 and the third positive electrode collector 231 can be more reliably held by the second space holding body 720 surrounding the periphery of the second adhesion layer 120. As a result, generation of missing and the like of the active material and/or the solid electrolyte caused by the deformation of the first negative electrode collector 212 and/or the third positive electrode collector 231 can be more suppressed.

In addition, in the battery manufacturing method according to Embodiment 2, the second space holding body forming step S1204 may be a step to be performed after the first adhesion layer forming step S1101, the first & second power generating element laminating step S1102, the second adhesion layer forming step S1201, the first & third power generating element laminating step S1202, the pressing step S1203, and the first space holding body forming step S1104 are all performed. Alternatively, the second space holding body forming step S1204 may be a step to be performed between any two steps among the first adhesion layer forming step S1101, the first & second power generating element laminating step S1102, the second adhesion layer forming step S1201, the first & third power generating element laminating step S1202, the pressing step S1203, and the first space holding body forming step S1104.

Figure 26:
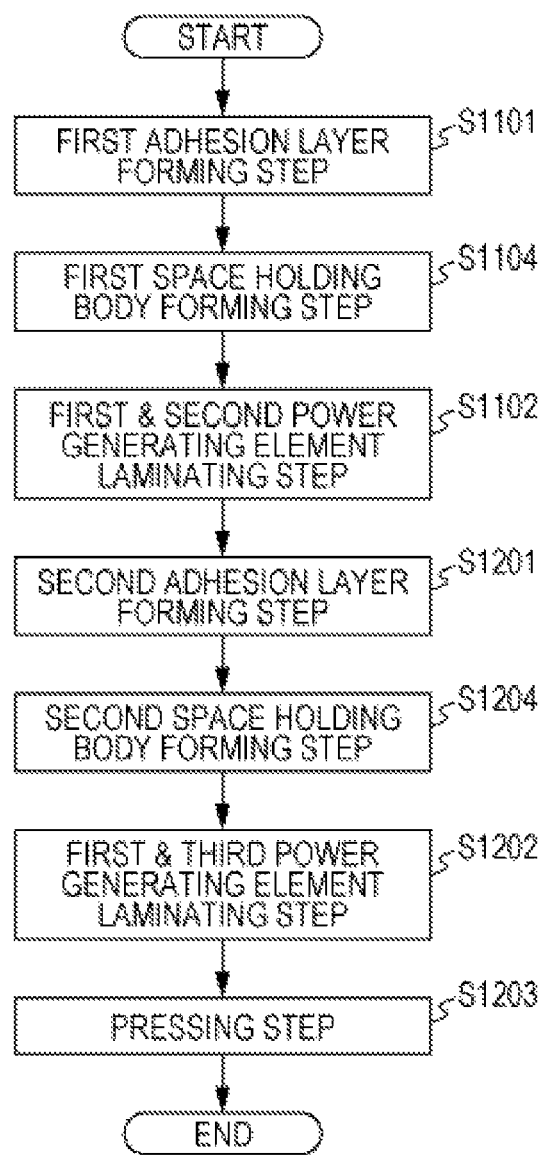
FIG. 26 is a flowchart showing a modified example of the battery manufacturing method according to Embodiment 2.

FIG. 26 is a flowchart showing a modified example of the battery manufacturing method according to Embodiment 2.

As shown in FIG. 26, in the battery manufacturing method according to Embodiment 2, the second space holding body forming step S1204 may be performed after the second adhesion layer forming step S1201 is performed. In this case, the first & third power generating element laminating step S1202 may be performed after the second space holding body forming step S1204 is performed.

In this case, in the first & third power generating element laminating step S1202, the second space holding body 720 may be in contact with the first negative electrode collector 212 and the third positive electrode collector 231. For example, one principal surface (such as a part or the entire thereof) of the second space holding body 720 may be in close contact (for example, may be joined) with the first negative electrode collector 212. In this case, the other principal surface (such as a part or the entire thereof) of the second space holding body 720 may be in close contact (for example, may be joined) with the third positive electrode collector 231.

By the manufacturing apparatus or the manufacturing method described above, in manufacturing of the battery, the spread of the second adhesion layer 120 can be blocked by the second space holding body 720. Accordingly, at the end portion of the first negative electrode collector 212 and at the end portion of the third positive electrode collector 231, the thickness of the second adhesion layer 120 can be more suppressed from being excessively increased. As a result, the end portion of the first negative electrode collector 212 and the end portion of the third positive electrode collector 231 can be more avoided from being deformed by the second adhesion layer 120.

In addition, in the battery manufacturing apparatus 2100 according to Embodiment 2, the control unit 600 controls the operation of the laminating unit 300, the adhesion layer forming unit 400, the pressing unit 500, and the space holding body forming unit 800.

In addition, in Embodiment 2, the space holding body forming unit 800 may include a coating mechanism coating a space holding body material which is a coating agent. The space holding body forming unit 800 may include, for example, an ejection mechanism (such as an ejection port) ejecting the coating agent, a supplying mechanism (such as a tank and a cylinder) supplying the coating agent to the ejection mechanism, and a transporting mechanism (such as a roller) transporting a power generating element to be coated.

Hereinafter, one concrete example of the battery manufacturing method according to Embodiment 2 will be described.

Figure 10:
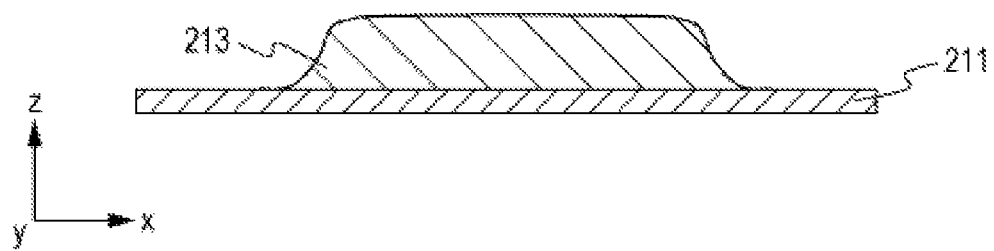
FIG. 10 is a cross-sectional view showing a schematic structure of constituent members of a first power generating element in a manufacturing process.

FIG. 10 is a cross-sectional view showing a schematic structure of constituent members of the first power generating element 210 in a manufacturing process.

As shown in FIG. 10, the first positive electrode active material layer 213 is formed on the first positive electrode collector 211. That is, a paste-like paint in which a material of the first positive electrode active material layer 213 is kneaded with a solvent is applied on the first positive electrode collector 211 and is then dried, so that the first positive electrode active material layer 213 is formed. In order to increase the density of the first positive electrode active material layer 213, after being dried, the first positive electrode active material layer 213 may be pressed. The thickness of the first positive electrode active material layer 213 thus formed is, for example, 5 to 300 µm.

Figure 11:
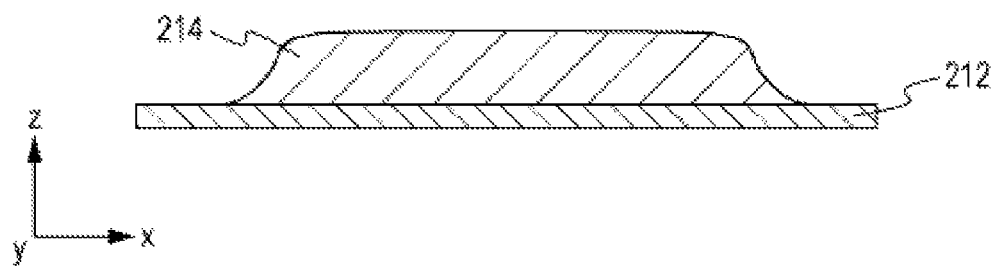
FIG. 11 is a cross-sectional view showing a schematic structure of constituent members of the first power generating element in a manufacturing process.

FIG. 11 is a cross-sectional view showing a schematic structure of constituent members of the first power generating element 210 in a manufacturing process.

As shown in FIG. 11, the first negative electrode active material layer 214 is formed on the first negative electrode collector 212. That is, a paste-like paint in which a material of the first negative electrode active material layer 214 is kneaded with a solvent is applied on the first negative electrode collector 212 and is then dried, so that the first negative electrode active material layer 214 is formed. In order to increase the density of the first negative electrode active material layer 214, after being dried, the first negative electrode active material layer 214 may be pressed. The thickness of the first negative electrode active material layer 214 thus formed is, for example, 5 to 300 µm.

Figure 12:
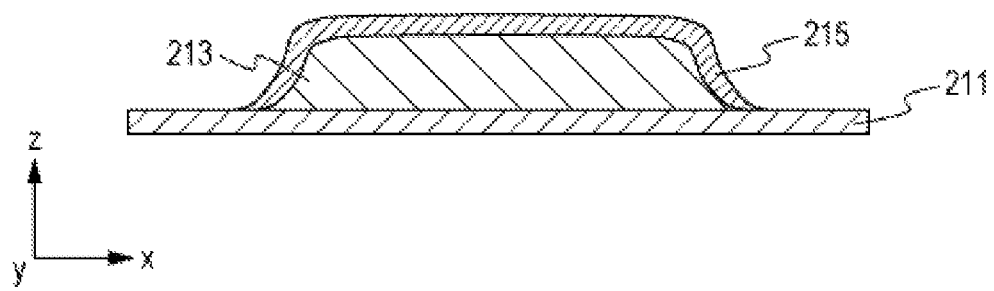
FIG. 12 is a cross-sectional view showing a schematic structure of constituent members of the first power generating element in a manufacturing process.

FIG. 12 is a cross-sectional view showing a schematic structure of constituent members of the first power generating element 210 in a manufacturing process.

As shown in FIG. 12, the first solid electrolyte layer 215 is formed on the first positive electrode active material layer 213. That is, a paste-like paint in which a material of the first solid electrolyte layer 215 is kneaded with a solvent is applied on the first positive electrode active material layer 213 and is then dried, so that the first solid electrolyte layer 215 is formed.

Figure 13:
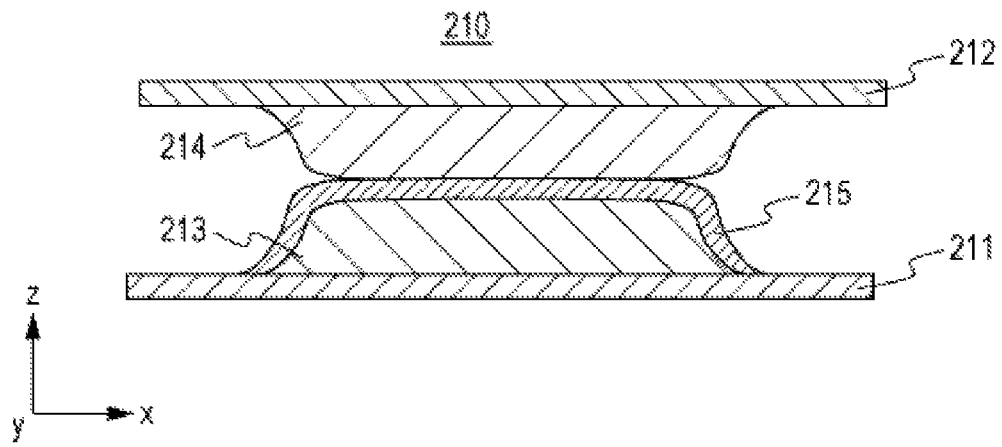
FIG. 13 is a cross-sectional view showing a schematic structure of the first power generating element.

FIG. 13 is a cross-sectional view showing a schematic structure of the first power generating element 210.

As shown in FIG. 13, a positive electrode plate shown in FIG. 12 in which the first solid electrolyte layer 215 is formed on the first positive electrode active material layer 213 and a negative electrode plate shown in FIG. 11 are laminated so that the first positive electrode active material layer 213 and the first negative electrode active material layer 214 face each other with (i.e., via) the first solid electrolyte layer 215 interposed therebetween, and as a result, the first power generating element 210 is formed.

Alternatively, the first power generating element 210 may have the following structure.

Figure 14:
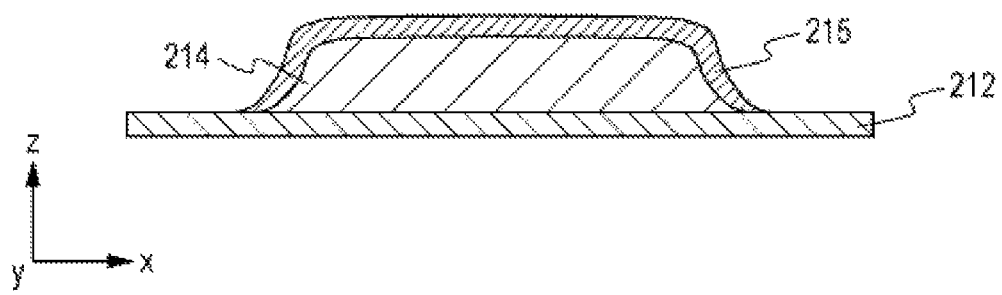
FIG. 14 is a cross-sectional view showing a schematic structure of the constituent members of the first power generating element in a manufacturing process.

FIG. 14 is a cross-sectional view showing a schematic structure of constituent members of the first power generating element 210 in a manufacturing process.

As shown in FIG. 14, the first solid electrolyte layer 215 is formed on the first negative electrode active material layer 214.

Figure 15:
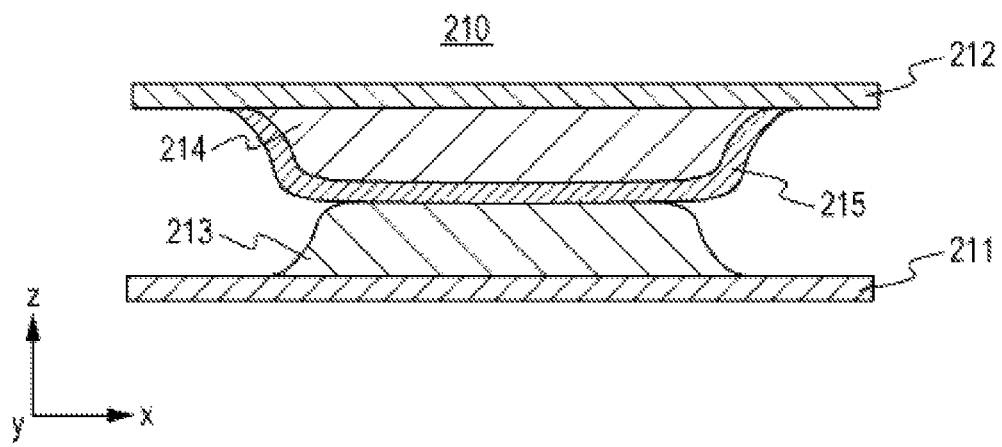
FIG. 15 is a cross-sectional view showing a schematic structure of the first power generating element.

FIG. 15 is a cross-sectional view showing a schematic structure of the first power generating element 210.

As shown in FIG. 15, a positive electrode plate shown in FIG. 10 and a negative electrode plate shown in FIG. 14 in which the first solid electrolyte layer 215 is formed on the first negative electrode active material layer 214 are laminated to each other so that the first positive electrode active material layer 213 and the first negative electrode active material layer 214 face each other with (i.e., via) the first solid electrolyte layer 215 interposed therebetween, and as a result, the first power generating element 210 is formed.

The first power generating element 210 as shown in FIG. 13 or FIG. 15 is pressed by pressure application. By the pressure application, the layers are each densified and are placed in a preferable joint state. In this case, when the layers are joined with each other, the surface forming the first positive electrode active material layer 213 may be configured so as not to extend past the surface forming the first negative electrode active material layer 214 which faces the first positive electrode active material layer 213.

In addition, in the above manufacturing process, the order of forming the layers of the first power generating element 210 is not particularly limited. In addition, for the formation of the layers of the first power generating element 210, for example, lamination, adhesion, transfer, and the combination thereof may be appropriately performed.

By a formation method similar to that of the first power generating element 210 described above, the second power generating element 220 and the third power generating element 230 are formed.

Figure 16:
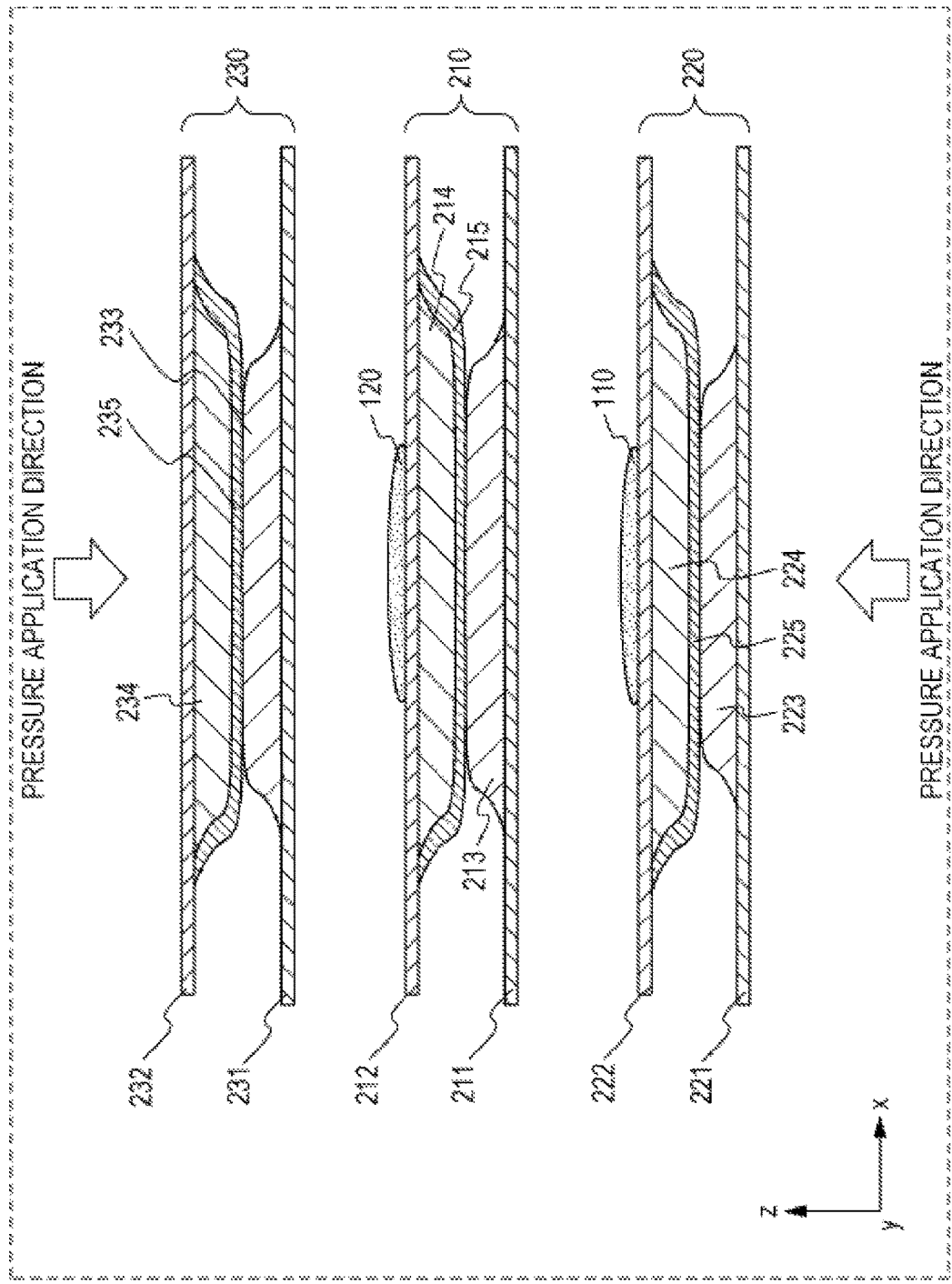
FIG. 16 is a cross-sectional view showing a schematic structure of each power generating element and each adhesion layer in a manufacturing process.

FIG. 16 is a cross-sectional view showing a schematic structure of the power generating elements and the adhesion layers in a manufacturing process.

First, the first adhesion layer forming step S1101 is performed. That is, by the adhesion layer forming unit 400, the first adhesion layer 110 is formed (coated) on the second negative electrode collector 222 in the region forming the first positive electrode active material layer 213 or the region forming the second negative electrode active material layer 224, whichever is smaller (that is, in the region forming the first positive electrode active material layer 213), the first adhesion layer 110 being located between the first positive electrode collector 211 and the second negative electrode collector 222.

Next, the first & second power generating element laminating step S1102 is performed. That is, by the laminating unit 300, in the state in which the first positive electrode collector 211 and the second negative electrode collector 222 face each other with (i.e., via) the first adhesion layer 110 interposed therebetween, and also in the state in which in the region in which the first positive electrode active material layer 213 and the second negative electrode active material layer 224 face each other, the first positive electrode collector 211 and the second negative electrode collector 222 are not in contact with each other, the first power generating element 210 is laminated on the second power generating element 220 (that is, on the first adhesion layer 110).

Next, the second adhesion layer forming step S1201 is performed. That is, by the adhesion layer forming unit 400, the second adhesion layer 120 is formed (coated) on the first negative electrode collector 212 in the region forming the first negative electrode active material layer 214 or the region forming the third positive electrode active material layer 233, whichever is smaller (that is, in the region forming the third positive electrode active material layer 233), the second adhesion layer 120 being located between the first negative electrode collector 212 and the third positive electrode collector 231.

Next, the first & third power generating element laminating step S1202 is performed. That is, by the laminating unit 300, in the state in which the first negative electrode collector 212 and the third positive electrode collector 231 face each other with (i.e., via) the second adhesion layer 120 interposed therebetween, and also in the state in which in the region in which the first negative electrode active material layer 214 and the third positive electrode active material layer 233 face each other, the first negative electrode collector 212 and the third positive electrode collector 231 are not in contact with each other, the third power generating element 230 is laminated on the first power generating element 210 (that is, on the second adhesion layer 120).

Next, the pressing step S1203 is performed. That is, by the pressing unit 500, a laminate formed of the second power generating element 220, the first adhesion layer 110, the first power generating element 210, the second adhesion layer 120, and the third power generating element 230 is pressed. In addition, the pressing direction (pressure application direction) is a direction shown by the arrow in FIG. 16.

By the manufacturing method described above, for example, the above battery 1200 shown in FIG. 3 can be formed.

In addition, the first adhesion layer 110 and the second adhesion layer 120 each may be formed (coated) in a wider region. Accordingly, for example, the above battery 1300 shown in FIG. 4 can be formed.

As described above, between the positive electrode collector of one single battery element and the negative electrode collector of another single battery element, the electrically conductive adhesive is applied and then pressed by pressure application. In this case, in the example shown in FIG. 16, among the positive electrode collector, the positive electrode active material layer, the solid electrolyte layer, the negative electrode active material layer, and the negative electrode collector, which form each power generating element, the region forming the positive electrode active material layer is smallest. That is, the region forming the positive electrode active material layer is included in the regions forming all the other constituent layers. In this case, the region in which the electrically conductive adhesive is applied is set to be wide as much as possible so that the adhesion layer pressed by the pressure application does not extend past the region forming the positive electrode active material layer. That is, as shown in FIG. 16, by the use of the electrically conductive paste which is applied so as not to extend past the region forming the positive electrode active material layer by the pressure application, the layers are joined together by the pressure application. In this case, in the entire region in which the adhesive is applied, the electrically conductive adhesive is most strongly pressed, so that a thin adhesion layer is formed. Hence, in the adhesion layer thus formed, a portion having an excessively large thickness is not formed.

In addition, the electrically conductive adhesive may be applied so that the adhesion layer pressed by the pressure application is formed in a region corresponding to 50% or more (or 80% or more) of the region forming the positive electrode active material layer. Accordingly, in the region forming the positive electrode active material layer which is the smallest region among those of the primary portions of the single battery element, a portion at which the negative electrode collector of one single battery element and the positive electrode collector of another single battery element adjacent thereto are simply in contact with each other is not allowed to be formed.

Figure 17:
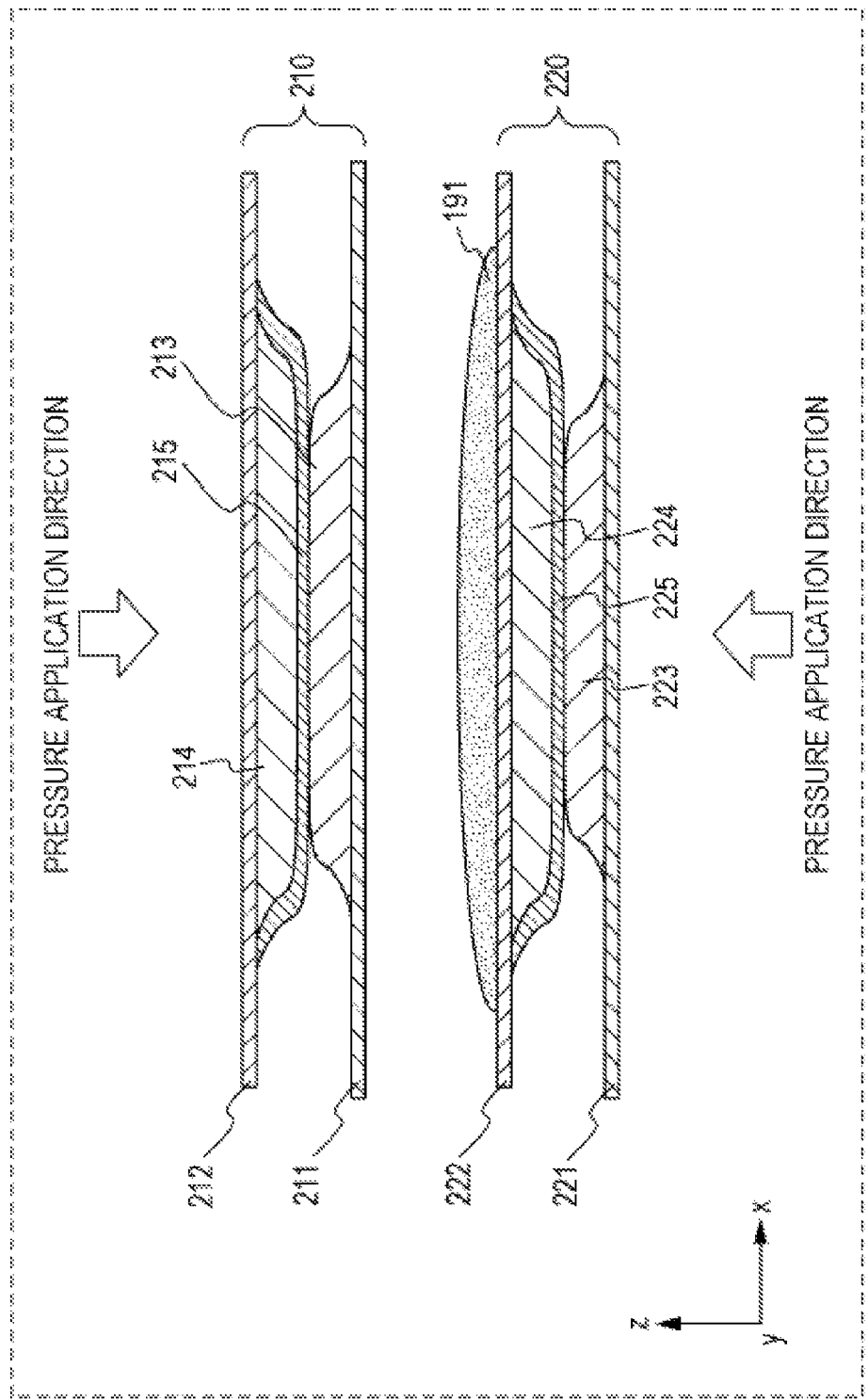
FIG. 17 is a cross-sectional view showing a schematic structure of each power generating element and an adhesion layer of a battery according to Comparative Example 1 in a manufacturing process.

FIG. 17 is a cross-sectional view showing a schematic structure of power generating elements and an adhesion layer in a manufacturing process of a battery 910 according to Comparative Example 1.

In a manufacturing method of the battery 910 according to Comparative Example 1, as shown in FIG. 17, on the second negative electrode collector 222, an adhesion layer 191 is also formed (coated) to extend past the region forming the first positive electrode active material layer 213 or the region forming the second negative electrode active material layer 224, whichever is smaller (that is, the region forming the first positive electrode active material layer 213).

That is, in the manufacturing method of the battery 910 according to Comparative Example 1, the adhesion layer 191 is formed (coated) in a region larger than each of the region forming the first positive electrode active material layer 213 and the region forming the second negative electrode active material layer 224 (such as the entire region of the second negative electrode collector 222).

In the state shown in FIG. 17 in which the adhesive is coated, the pressure application is performed. In addition, the pressing direction (pressure application direction) is a direction shown by the arrow in FIG. 17. Accordingly, in the region forming the first positive electrode active material layer 213, the adhesive is most strongly pressed, so that a thin adhesion layer 191 is formed. However, the thickness of the adhesion layer 191 located outside the region forming the first positive electrode active material layer 213 is larger than that of the adhesion layer 191 located in the region forming the first positive electrode active material layer 213. That is, in Comparative Example 1, as shown in FIG. 18, out of the region forming the first positive electrode active material layer 213 and the region forming the second negative electrode active material layer 224, the thickness of the adhesion layer 191 is excessively increased. As a result, the end portion of the first positive electrode collector 211 and the end portion of the second negative electrode collector 222 are deformed by the adhesion layer 191.

On the other hand, by the manufacturing apparatus or the manufacturing method according to Embodiment 2, as described above, the thickness of the first adhesion layer 110 is not excessively increased. Hence, while a strong adhesion and a stable electrical connection between the first power generating element 210 and the second power generating element 220 are realized, the probability of contact between the positive electrode collector and the negative electrode collector can be reduced. In addition, degradation (such as generation of cracks) of the first positive electrode active material layer 213, the second negative electrode active material layer 224, and the solid electrolyte layer can be prevented.

In an all-solid-state battery, a solid electrolyte layer is used instead of using an electrolyte liquid. Hence, the structure in which a plurality of batteries is connected in series can be advantageously formed. For example, there can be formed a bipolar all-solid-state battery in which laminates (bipolar structures) in each of which a positive electrode active material layer and a negative electrode active material layer are formed on a front and a rear surface of a collector are repeatedly laminated with (i.e., via) solid electrolyte layers interposed therebetween and are connected to each other in series. In addition, a bipolar all-solid-state battery may also be formed in such a way that after a plurality of single batteries, each of which is formed by laminating a positive electrode collector, a positive electrode active material layer, a solid electrolyte layer, a negative electrode active material layer, and a negative electrode collector, are prepared, the positive electrode collectors and the negative electrode collectors are electrically connected to each other. When the adhesion type bipolar all-solid-state battery as described above is formed, the adhesion structure is particularly important. Hence, according to the adhesion structure of Embodiment 1 or 2, for example, a highly reliable bipolar all-solid-state battery suitable for a large current application can be realized.

The present disclosure can be preferably applied to a battery to be used for various electronic apparatuses, electrical appliances, electric vehicles, and the like, each of which is required to have easy handling performance, high reliability, large current characteristics, and the like.

What is claimed is:

1. A battery comprising:
a first power generating element;
a second power generating element laminated on the first power generating element; and
a first adhesion layer adhering the first power generating element to the second power generating element,
wherein the first power generating element includes a first positive electrode collector, a first negative electrode collector, a first positive electrode active material layer, a first negative electrode active material layer, and a first solid electrolyte layer,
the first positive electrode active material layer and the first negative electrode active material layer are laminated to each other via the first solid electrolyte layer,
the first positive electrode active material layer is disposed in a first region smaller than the first positive electrode collector in contact with the first positive electrode collector,
the first negative electrode active material layer is disposed in a second region smaller than the first negative electrode collector in contact with the first negative electrode collector,
the second power generating element includes a second positive electrode collector, a second negative electrode collector, a second positive electrode active material layer, a second negative electrode active material layer, and a second solid electrolyte layer,
the second positive electrode active material layer and the second negative electrode active material layer are laminated to each other via the second solid electrolyte layer,
the second positive electrode active material layer is disposed in a third region smaller than the second positive electrode collector in contact with the second positive electrode collector, the second negative electrode active material layer is disposed in a fourth region smaller than the second negative electrode collector in contact with the second negative electrode collector, the first positive electrode collector and the second negative electrode collector face each other via the first adhesion layer, an outer periphery of the first adhesion layer is disposed within the first region in which the first positive electrode active material layer is disposed or within the second fourth region in which the second negative electrode active material layer is disposed, whichever is smaller, between the first positive electrode collector and the second negative electrode collector, and the first positive electrode collector and the second negative electrode collector are not in contact with each other in a fifth region in which the first positive electrode active material layer and the second negative electrode active material layer face each other.

2. The battery according to claim 1, wherein the outer periphery of the first adhesion layer is disposed in an entirety of the fifth region in which the first positive electrode active material layer and the second negative electrode active material layer face each other.

3. The battery according to claim 1, wherein the outer periphery of the first adhesion layer is disposed within an area corresponding to 50% or more of the first region forming the first positive electrode active material layer or the fourth region forming the second negative electrode active material layer, whichever is smaller.

4. The battery according to claim 1, further comprising:
a first space holding body holding a space between the first power generating element and the second power generating element,
wherein the first space holding body is disposed between the first positive electrode collector and the second negative electrode collector at a position at which the first adhesion layer is not disposed.

5. The battery according to claim 4, wherein the first space holding body is disposed with surrounding the outer periphery of the first adhesion layer.

6. The battery according to claim 4, wherein the first space holding body is in contact with the first positive electrode collector and the second negative electrode collector.

7. The battery according to claim 1, further comprising:
a third power generating element laminated on the first power generating element; and
a second adhesion layer adhering the first power generating element to the third power generating element,
wherein the third power generating element includes a third positive electrode collector, a third negative electrode collector, a third positive electrode active material layer, a third negative electrode active material layer, and a third solid electrolyte layer, the third positive electrode active material layer and the third negative electrode active material layer are laminated to each other via the third solid electrolyte layer, the third positive electrode active material layer is disposed in a sixth region smaller than the third positive electrode collector in contact with the third positive electrode collector, the third negative electrode active material layer is disposed in a seventh region smaller than the third negative electrode collector in contact with the third negative electrode collector, the first negative electrode collector and the third positive electrode collector face each other via the second adhesion layer, an outer periphery of the second adhesion layer is disposed within the second region in which the first negative electrode active material layer is disposed or within the sixth region in which the third positive electrode active material layer is disposed, whichever is smaller, between the first negative electrode collector and the third positive electrode collector, and the first negative electrode collector and the third positive electrode collector are not in contact with each other in an eighth region in which the first negative electrode active material layer and the third positive electrode active material layer face each other.

8. The battery according to claim 7, wherein the outer periphery of the second adhesion layer is disposed within an area corresponding to 50% or more of the second region forming the first negative electrode active material layer or the sixth region forming the third positive electrode active material layer, whichever is smaller.

9. The battery according to claim 7, wherein the outer periphery of the second adhesion layer is disposed in an entirety of the eighth region in which the first negative electrode active material layer and the third positive electrode active material layer face each other.

10. The battery according to claim 7, further comprising:
a second space holding body holding a space between the first power generating element and the third power generating element,
wherein the second space holding body is disposed between the first negative electrode collector and the third positive electrode collector at a position at which the second adhesion layer is not disposed.

11. The battery according to claim 10, wherein the second space holding body is disposed with surrounding the outer periphery of the second adhesion layer.

12. The battery according to claim 10, wherein the second space holding body is in contact with the first negative electrode collector and the third positive electrode collector.

* * * * *